United States Patent
Parkinson et al.

(10) Patent No.: US 12,474,983 B2
(45) Date of Patent: Nov. 18, 2025

(54) SYSTEM AND METHOD FOR REACTIVE MESSAGING CLIENT FOR USE WITH A MICROSERVICES ENVIRONMENT

(71) Applicant: ORACLE INTERNATIONAL CORPORATION, Redwood Shores, CA (US)

(72) Inventors: Paul Parkinson, Jacksonville, FL (US); Daniel Kec, Prague (CZ)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/230,581

(22) Filed: Apr. 14, 2021

(65) Prior Publication Data
US 2021/0326192 A1  Oct. 21, 2021

Related U.S. Application Data

(60) Provisional application No. 63/009,954, filed on Apr. 14, 2020.

(51) Int. Cl.
*G06F 9/54* (2006.01)
*H04L 67/10* (2022.01)

(52) U.S. Cl.
CPC .............. *G06F 9/546* (2013.01); *G06F 9/541* (2013.01); *H04L 67/10* (2013.01)

(58) Field of Classification Search
CPC ......... H04L 69/40; H04L 67/02; H04L 67/10; H04L 67/40; G06F 9/541; G06F 9/546; G06F 9/466; G06F 9/45521; G06F 8/60
See application file for complete search history.

(56) References Cited

U.S. PATENT DOCUMENTS

| | | | |
|---|---|---|---|
| 4,882,674 A | 11/1989 | Quint | |
| 5,687,373 A | 11/1997 | Holmes | |
| (Continued) | | | |

FOREIGN PATENT DOCUMENTS

| | | |
|---|---|---|
| CN | 110225131 | 9/2019 |
| CN | 113076965 | 7/2021 |
| (Continued) | | |

OTHER PUBLICATIONS

Redlich "Oracle Introduces Helidon—A Lightweight Java Microservices Framework" Oct. 2018 pp. 1-10.*

(Continued)

*Primary Examiner* — Charles E Anya
(74) *Attorney, Agent, or Firm* — TUCKER ELLIS LLP

(57) ABSTRACT

In accordance with an embodiment, described herein is a system and method for enabling use of a reactive messaging client in microservice environments. A microservices (e.g., Helidon) environment provides a development framework that enables a software developer to create and use microservices. In accordance with an embodiment, the system can include a reactive messaging API, for use with long-running activities or other types of transactions associated with microservices, which enables the system to additionally support various reactive messaging features, such as, for example, transaction processing, asynchronous messaging, reactive streams, or the use of messaging channels, in a microservices environment.

15 Claims, 14 Drawing Sheets

(56) References Cited

U.S. PATENT DOCUMENTS

| | | | |
|---|---|---|---|
| 5,915,112 A | 6/1999 | Boutcher | |
| 6,269,841 B1 | 8/2001 | Chen | |
| 6,918,053 B1* | 7/2005 | Thatte | G06Q 10/10 |
| | | | 714/16 |
| 9,747,131 B1 | 8/2017 | Goldman | |
| 10,212,041 B1 | 2/2019 | Rastogi | |
| 10,693,734 B2 | 6/2020 | Rastogi | |
| 11,290,350 B2* | 3/2022 | Chaloupka | G06F 9/44 |
| 11,504,029 B1 | 11/2022 | Martin | |
| 2002/0087657 A1 | 7/2002 | Hunt | |
| 2003/0056030 A1 | 3/2003 | Gao | |
| 2004/0221017 A1 | 11/2004 | Yoon | |
| 2005/0021689 A1 | 1/2005 | Marvin | |
| 2005/0222946 A1* | 10/2005 | Mulholland | G06Q 20/10 |
| | | | 705/39 |
| 2006/0215556 A1 | 9/2006 | Wu | |
| 2007/0112574 A1 | 5/2007 | Greene | |
| 2007/0236470 A1 | 10/2007 | Abanami | |
| 2008/0115123 A1 | 5/2008 | Kelly | |
| 2008/0313649 A1 | 12/2008 | Tian | |
| 2009/0033976 A1 | 2/2009 | Ding | |
| 2009/0150423 A1 | 6/2009 | Spanton | |
| 2010/0058330 A1 | 3/2010 | DeHaan | |
| 2010/0082472 A1 | 4/2010 | Cheung | |
| 2010/0138521 A1 | 6/2010 | DeHaan | |
| 2011/0238792 A1 | 9/2011 | Phillips | |
| 2012/0117145 A1 | 5/2012 | Clift | |
| 2014/0237595 A1 | 8/2014 | Irimescu | |
| 2014/0372510 A1 | 12/2014 | Fausak | |
| 2014/0373098 A1 | 12/2014 | Fausak | |
| 2015/0242059 A1 | 8/2015 | Fausak | |
| 2015/0365480 A1 | 12/2015 | Soto | |
| 2016/0294667 A1 | 10/2016 | Prabhakar | |
| 2016/0323188 A1 | 11/2016 | Guzman | |
| 2016/0323197 A1 | 11/2016 | Guzman | |
| 2017/0187597 A1 | 6/2017 | Nolan | |
| 2017/0187785 A1 | 6/2017 | Johnson | |
| 2017/0255642 A1 | 9/2017 | Dayan | |
| 2017/0331812 A1 | 11/2017 | Lander | |
| 2017/0331813 A1 | 11/2017 | Lander | |
| 2017/0331829 A1 | 11/2017 | Lander | |
| 2018/0083835 A1 | 3/2018 | Cole | |
| 2018/0084063 A1 | 3/2018 | Miedema | |
| 2018/0089011 A1 | 3/2018 | Basiri | |
| 2018/0113799 A1 | 4/2018 | Shankar | |
| 2018/0227974 A1 | 8/2018 | Puttagunta | |
| 2018/0234523 A1 | 8/2018 | Jose | |
| 2018/0276041 A1 | 9/2018 | Bansal | |
| 2018/0307514 A1* | 10/2018 | Koutyrine | G06F 11/0706 |
| 2018/0309637 A1 | 10/2018 | Gill | |
| 2018/0316568 A1 | 11/2018 | Gill | |
| 2018/0316780 A1 | 11/2018 | Baird | |
| 2019/0042339 A1 | 2/2019 | Doshi | |
| 2019/0045037 A1 | 2/2019 | Sukhomlinov | |
| 2019/0089809 A1 | 3/2019 | Theebaprakasam | |
| 2019/0102162 A1 | 4/2019 | Pitre | |
| 2019/0123970 A1 | 4/2019 | Rastogi | |
| 2019/0179297 A1 | 6/2019 | Kuroda | |
| 2019/0238598 A1 | 8/2019 | Mohamad Abdul | |
| 2019/0243547 A1 | 8/2019 | Duggal | |
| 2019/0243688 A1 | 8/2019 | Karmarkar | |
| 2019/0243702 A1 | 8/2019 | Shilane | |
| 2019/0306138 A1 | 10/2019 | Carru | |
| 2019/0306173 A1 | 10/2019 | Reddy | |
| 2019/0347168 A1 | 11/2019 | Giannetti | |
| 2019/0356736 A1 | 11/2019 | Narayanaswamy | |
| 2019/0369987 A1 | 12/2019 | Chandrasekhar | |
| 2019/0377620 A1* | 12/2019 | Neijenhuis | G06F 9/548 |
| 2020/0007615 A1 | 1/2020 | Brebner | |
| 2020/0034272 A1 | 1/2020 | Tunnicliffe | |
| 2020/0110438 A1 | 4/2020 | Brubacher | |
| 2020/0112487 A1 | 4/2020 | Inamdar | |
| 2020/0112844 A1 | 4/2020 | Greenberg | |
| 2020/0117525 A1 | 4/2020 | Kachare | |
| 2020/0137125 A1 | 4/2020 | Patnala | |
| 2020/0228418 A1* | 7/2020 | Chaloupka | H04L 67/10 |
| 2020/0236278 A1 | 7/2020 | Yeung | |
| 2020/0322444 A1* | 10/2020 | Stefanko | H04L 67/55 |
| 2020/0349672 A1 | 11/2020 | Cochran | |
| 2020/0351332 A1 | 11/2020 | Palladino | |
| 2020/0366587 A1 | 11/2020 | White | |
| 2020/0394930 A1 | 12/2020 | Barab | |
| 2021/0075877 A1 | 3/2021 | Miedema | |
| 2021/0135971 A1* | 5/2021 | Martin | H04L 67/26 |
| 2021/0176326 A1* | 6/2021 | Carley | H04L 67/26 |

FOREIGN PATENT DOCUMENTS

| | | |
|---|---|---|
| WO | 2003030014 | 4/2003 |
| WO | 2009018838 | 2/2009 |
| WO | 2018200757 | 11/2018 |
| WO | 2019228515 | 12/2019 |
| WO | WO-2021137692 A1 * | 7/2021 |

OTHER PUBLICATIONS

Kralik "Integration of MicroProfile LRA with the Axon framework" Fall 2019 Masaryk University 103 pages.*

Rouse et al. "Sending and receiving messages between microservices with MicroProfile Reactive Messaging" Sep. 13 2019 Microprofile.*

European Patent Office, International Searching Authority, International Search Report and Written Opinion dated Jul. 19, 2021 for International Application No. PCT/US21/27298, 15 pages.

Munaf, Raja Mubashir et al., "Microservices Architecture: Challenges and Proposed Conceptual Design", 2019 International Conference on Communication Technologies (ComTech 2019), ©2019 IEEE, pp. 82-87.

United States Patent and Trademark Office, Office Communication dated Oct. 17, 2024 for U.S. Appl. No. 17/228,456, 20 pages.

United States Patent and Trademark Office, Office Communication dated May 7, 2024 for U.S. Appl. No. 17/228,456, 22 pages.

United States Patent and Trademark Office, Office Communication dated Dec. 13, 2024 for U.S. Appl. No. 17/228,456, 22 pages.

United States Patent and Trademark Office, Office Communication dated Jun. 23, 2023 for U.S. Appl. No. 17/228,456, 19 pages.

United States Patent and Trademark Office, Office Communication dated Dec. 5, 2022 for U.S. Appl. No. 17/228,456, 15 pages.

United States Patent and Trademark Office, Office Communication dated Mar. 2, 2022 for U.S. Appl. No. 17/228,456, 13 pages.

Cowen, Laura, Reactive programming in microservices with MicroProfile on Open Liberty 19.0.0.4, Open Liberty Blog, Apr. 26, 2019, https://openliberty.io/blog/2019/04/26/reactive-microservices-microprofile-19004.html.

Kishida Naoki, Lightweight simple framework Helidon by Oracle, Everyone's Java, First Edition, Japan, Gijutsu-Hyoron Co., Ltd., Mar. 26, 2020, pp. 178 to 179.

Richardson, Chris(author), Nagao Takahiro (translator), Method of maintaining data integrity with <saga> patterns, Microservices Patterns, first Edition, Japan, Impress Corporation, Mar. 21. 2020. pages 125 to 129.

Japan Patent Office, Notice of Reasons for Refusal dated Apr. 4, 2025 for Japanese Patent Application No. 2022-562592, 7 pages.

United States Patent and Trademark Office, Office Communication dated Apr. 30, 2025 for U.S. Appl. No. 17/228,456, 20 pages.

Intellectual Property India, Examination report under sections 12 & 13 of the Patents Act, 1970 and the Patents Rules, 2003 dated May 27, 2025 for India Patent Application No. 202247042737, 8 pages.

* cited by examiner

SYSTEM AND METHOD FOR REACTIVE MESSAGING CLIENT FOR USE WITH A MICROSERVICES ENVIRONMENT

CLAIM OF PRIORITY

This application claims the benefit of priority to U.S. Provisional Application titled "SYSTEM AND METHOD FOR REACTIVE MESSAGING CLIENT FOR USE WITH A MICROSERVICES ENVIRONMENT", Application No. 63/009,954, filed Apr. 14, 2020, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing and other computing environments, software development, and microservice architectures, and are particularly directed to systems and methods for enabling use of a reactive messaging client in microservice environments.

BACKGROUND

Microservice architectures have become popular for developing software applications to be provided in cloud computing environments as cloud services. Such environments can present a software application as a collection of loosely-coupled services that are independently deployable and communicate with one another over a network.

SUMMARY

In accordance with an embodiment, described herein is a system and method for enabling use of a reactive messaging client in microservice environments. A microservices (e.g., Helidon) environment provides a development framework that enables a software developer to create and use microservices. In accordance with an embodiment, the system can include a reactive messaging API, for use with long-running activities or other types of transactions associated with microservices, which enables the system to additionally support various reactive messaging features, such as, for example, transaction processing, asynchronous messaging, reactive streams, or the use of messaging channels, in a microservices environment.

DETAILED DESCRIPTION

As described above, microservice architectures have become popular for developing software applications to be provided in cloud computing environments as cloud services. Such environments can present a software application as a collection of loosely-coupled services that are independently deployable and communicate with one another over a network, in the manner of a service-oriented architecture.

Software development frameworks such as Helidon assist in the development of microservices. For example, Helidon provides Standard Edition (SE) and MicroProfile (MP) programming models or environments, each of which offers a collection of software libraries that can be used to provide a software developer with a foundation upon which to create a microservice, including features such as configuration, security, and web server functionality.

Technical advantages provided by such environments include that they alleviate the need for the software developer to program according to a particular tooling or deployment model, and enables the running of microservices without the need for an application server. The microservice libraries can interoperate with other software development, deployment, and monitoring tools such as, for example, Docker, Kubernetes, Prometheus, or OpenTracing.

Microservices Environment (Helidon)

Figure 1:
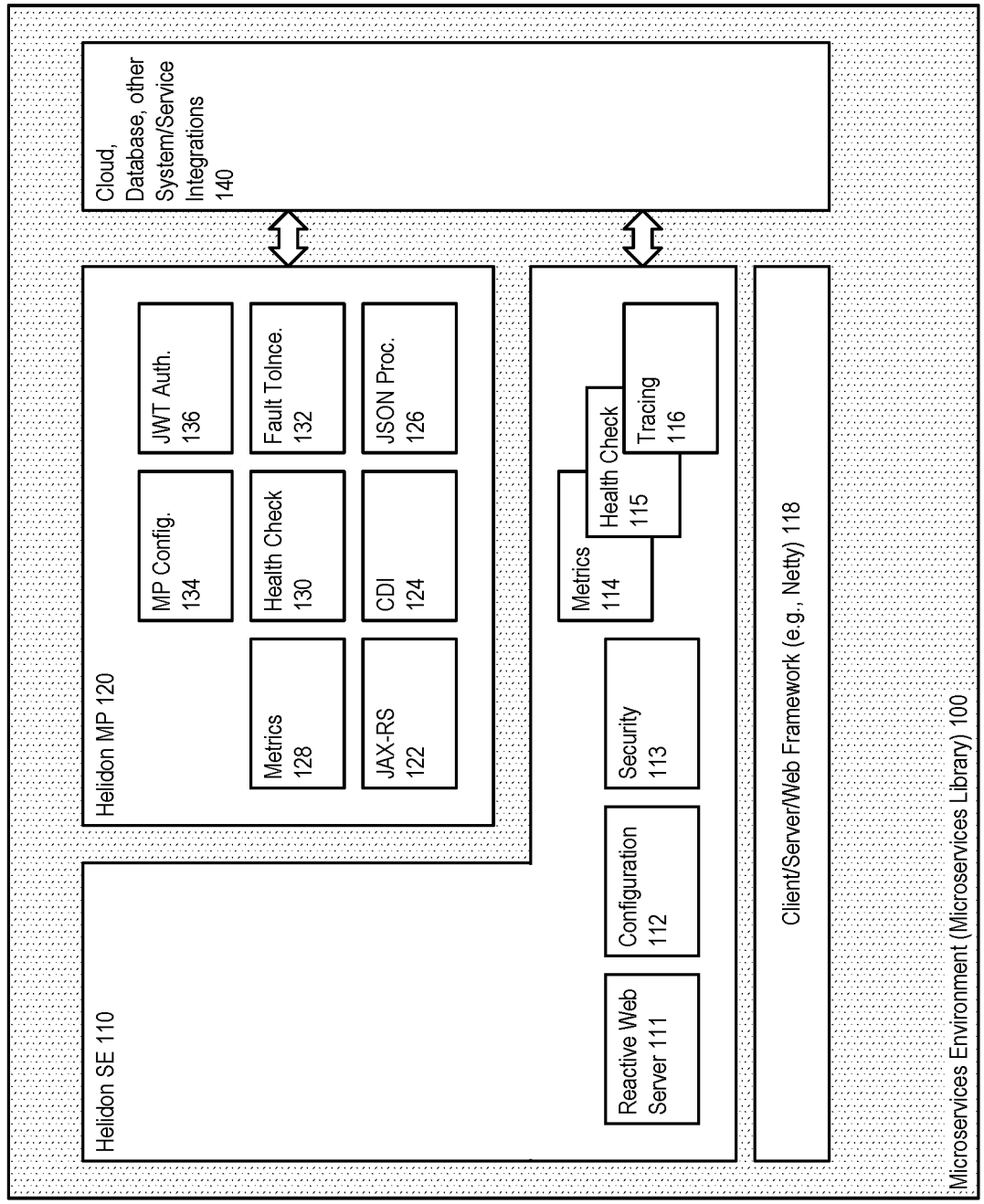
FIG. 1 illustrates an example microservices environment that provides a development framework, such as, for example, Helidon, in accordance with an embodiment.

FIG. 1 illustrates an example microservices environment that provides a development framework, such as, for example, Helidon, in accordance with an embodiment.

As illustrated in FIG. 1, in accordance with an embodiment, a microservices environment (microservices library) 100 can be provided as one or more software libraries, such as for example Helidon SE or Helidon MP programming models or environments.

In accordance with an embodiment, the components and processes illustrated in FIG. 1, and as further described herein with regard to various other embodiments, can be provided as software or program code executable by a computer system or other type of processing device. For example, in accordance with an embodiment, the components and processes described herein can be provided by a cloud computing system, or other suitably-programmed computer system.

In accordance with an embodiment, a Helidon SE environment 110 can include various libraries, application program interfaces (APIs), or other components, such as, for example, a reactive web server 111, which provides an asynchronous and reactive API for creating web applications; a configuration API 112, which provides a Java API to load and process configuration properties in key/value form into a configuration object which an application can then use to retrieve configuration data; and a security component 113, which provides authentication, authorization, and outbound security; and can also include metrics 114, health check 115, and tracing 116 or other components.

In accordance with an embodiment, a Helidon MP environment 120 can include various libraries, APIs, or other components, such as, for example, JAX-RS 122, CDI 124, JSON-P 126, metrics 128, health check 130, fault tolerance 132, MicroProfile configuration 134, and JWT authentication 136 components. The web server can be provided by a non-blocking client/server/web framework 118, such as, for example, Netty. The microservices environment can also enable interactions with cloud, database, or other systems or services 140.

Helidon Standard Edition (SE)

Figure 2:
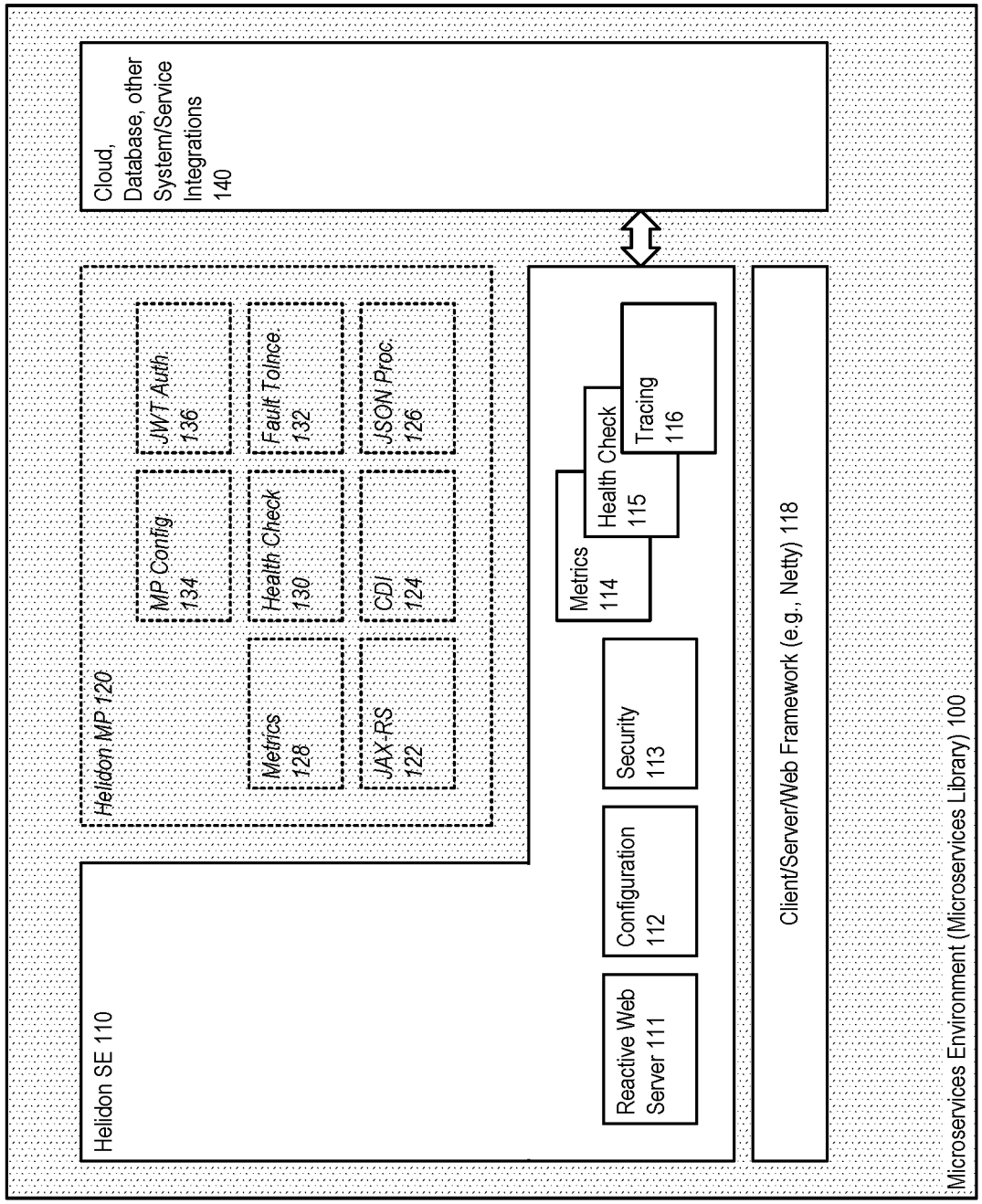
FIG. 2 illustrates an example Helidon SE microservices environment, in accordance with an embodiment.

FIG. 2 illustrates an example Helidon SE microservices environment, in accordance with an embodiment.

As illustrated in FIG. 2, in accordance with an embodiment, a Helidon SE environment supports a functional programming style that uses the web server, security and configuration components directly; provides the software developer with transparency and control; and supports Java features such as reactive streams, and asynchronous and functional programming. A Helidon SE environment provides a framework by which the software developer can build lightweight reactive microservices.

Helidon MP (MP)

Figure 3:
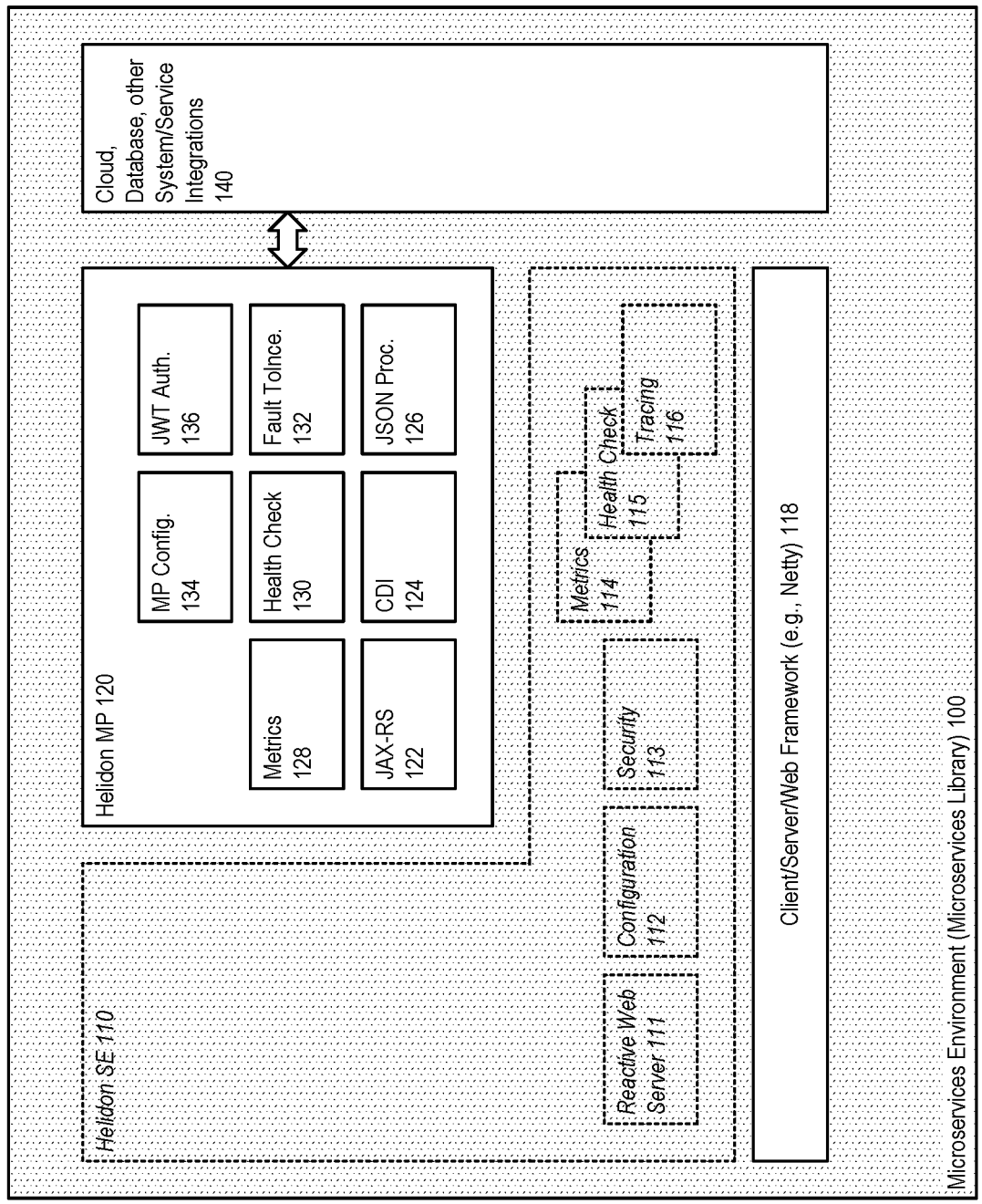
FIG. 3 illustrates an example Helidon MP microservices environment, in accordance with an embodiment.

FIG. 3 illustrates an example Helidon MP microservices environment, in accordance with an embodiment.

As illustrated in FIG. 3, in accordance with an embodiment, a Helidon MP environment supports a more declarative programming style, through the use of a MicroProfile family of APIs built on top of the Helidon libraries. A MicroProfile definition (for example, as specified by the Eclipse MicroProfile project) can be used to support application portability across multiple MicroProfile runtimes.

Integration with Cloud, Database, or Other Systems/Services

Figure 4:
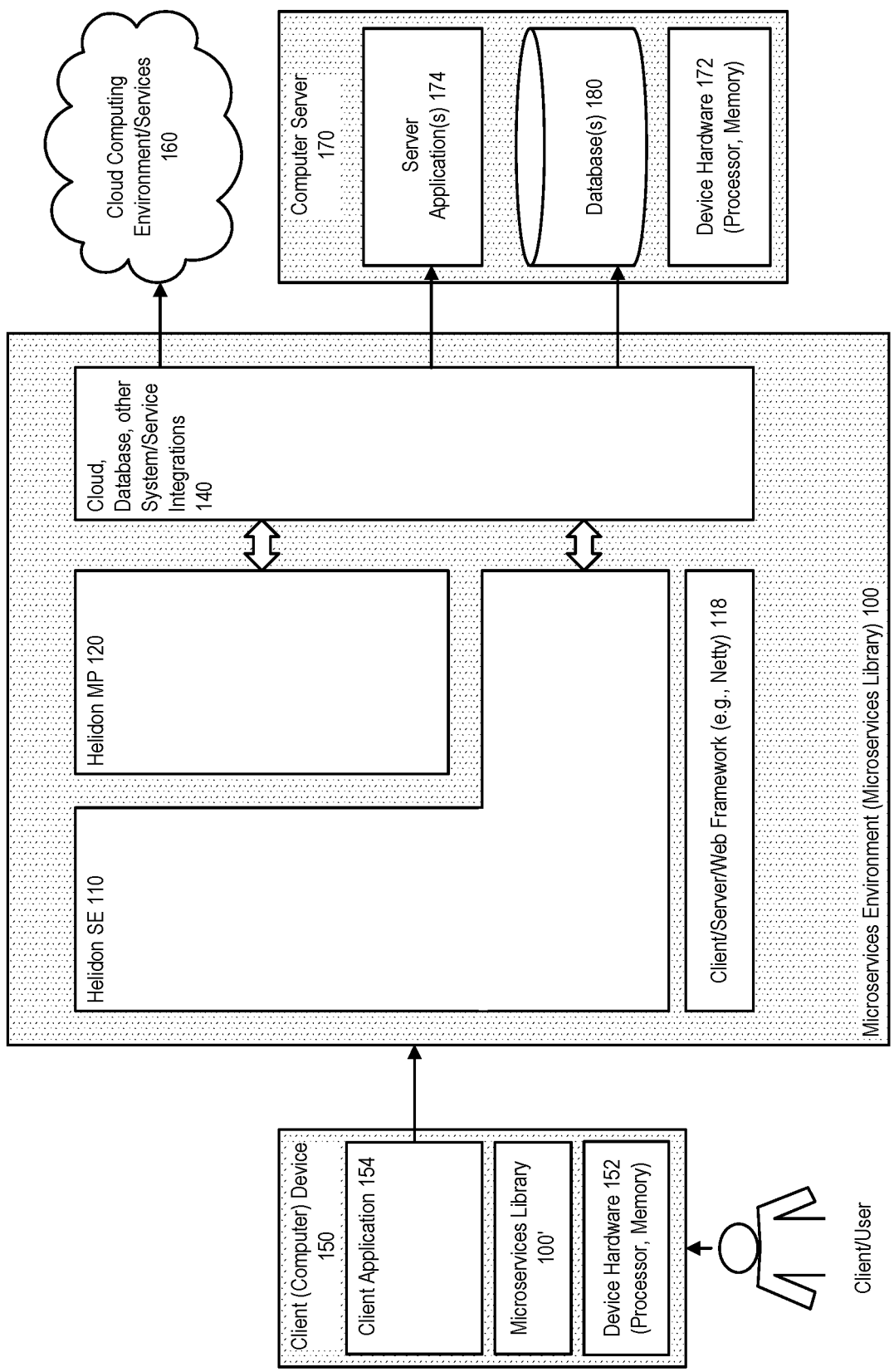
FIG. 4 illustrates an example microservices environment that enables one or more cloud, database, or other integrations, in accordance with an embodiment.

FIG. 4 illustrates an example microservices environment that enables one or more cloud, database, or other integrations, in accordance with an embodiment.

As illustrated in FIG. 4, in accordance with an embodiment, a microservices environment can enable a client (computer) device 150, having a device hardware 152 and client application 154, to interact with, for example, one or more cloud 160, server 170, 172, 174, database 180, or other cloud or on-premise systems or services.

For example, in accordance with an embodiment, when used together with an enterprise application environment, microservices can be used to interface with, connect, transform, or surface data from various enterprise application software products, such as, for example, and Oracle Fusion Applications environment; or communicate with enterprise server applications, databases, or other environments, such as, for example, an Oracle Database environment, or an Oracle Coherence environment.

Database Clients for Use with Microservices Environments

In accordance with an embodiment, microservices environments such as Helidon SE can be used to develop non-blocking reactive web server implementations. In such environments, a smaller number of threads can handle larger loads due to the reactive nature of the implementation. However, if the web server, or a client application, needs to communicate with a database using, for example, JDBC, which operates in a blocking manner, this can require locking a thread in the reactive web server or client application, which can lead to performance problems with reactive applications.

In accordance with an embodiment, a microservices environment such as, for example, Helidon SE, can include a database client and database client API that provides a unified, reactive API for communicating, accessing, retrieving data, and generally working with databases in a non-blocking manner. The database client can operate with a database driver, and can include a thread pool and control any blocking of threads, while the database client API is itself used by the software developer in a non-blocking manner, for example to incorporate use of a blocking JDBC driver in a reactive client application. Since the database client performs database operations only when requested, the database client reduces backpressure; while also supporting features such as metrics, tracing, health, and security.

Figure 5:
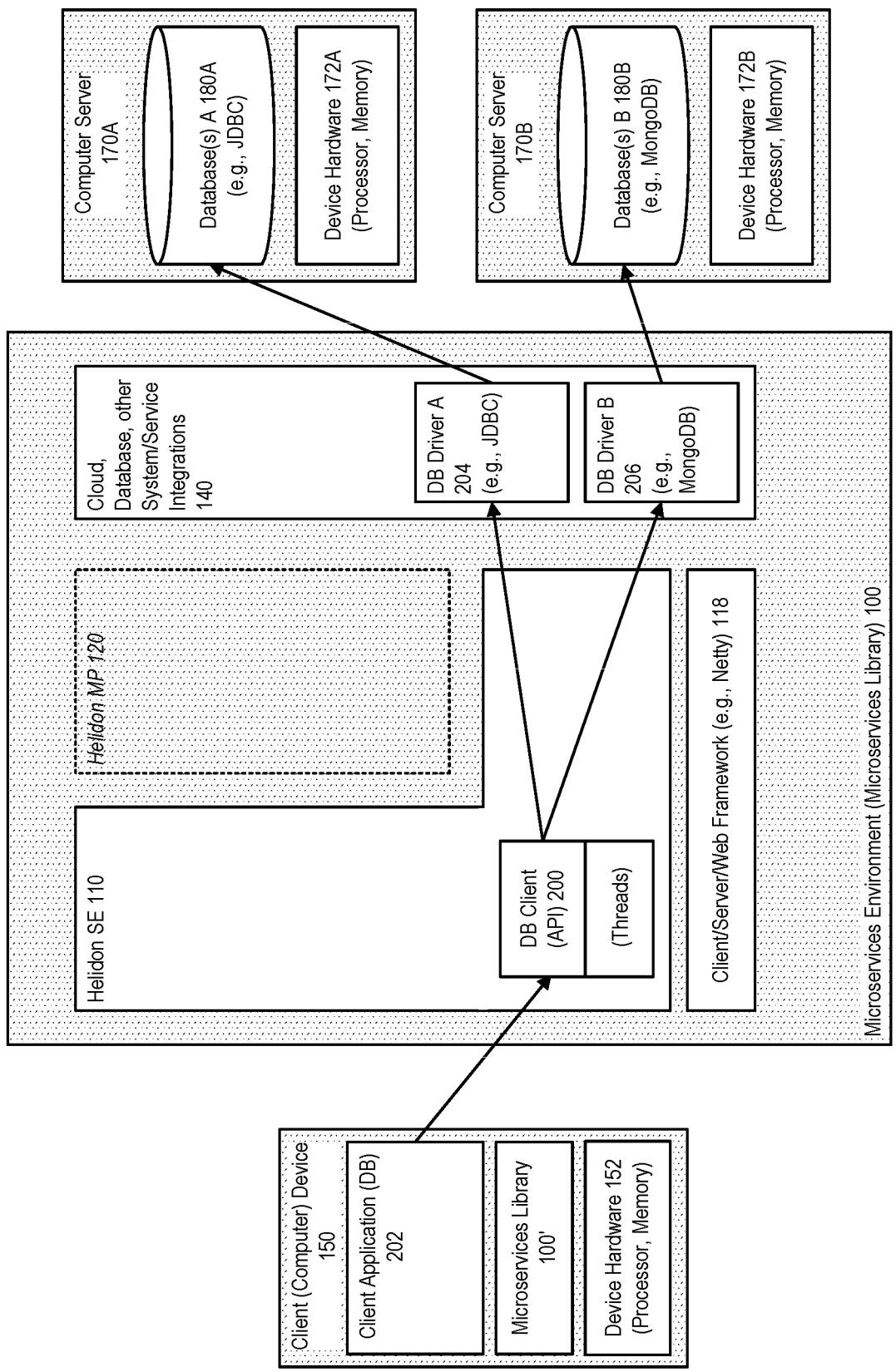
FIG. 5 illustrates the use of a database client in a microservices environment, in accordance with an embodiment.

FIG. 5 illustrates the use of a database client in a microservices environment, in accordance with an embodiment.

As illustrated in FIG. 5, in accordance with an embodiment, the database client 200 can operate with a variety of database drivers (for example, a JDBC driver 204, or a MongoDB Reactive Streams Java Driver 206), to enable access by a client application 202, to one or more database environments; and can operate similarly for SQL and NoSQL databases, so that CRUD operations can be supported by the API regardless of whether the database used at the backend is, for example, an Oracle JDBC database, or a MongoDB database.

In accordance with an embodiment, by moving native query code to configuration files, the database client allows a client application to use another database by changing the configuration associated with the database client. For example, a database client can be configured with:

```
source: jdbc or mongodb
connection: database connection parameters
statements: named statements when used
```

In accordance with an embodiment, the database client API can provide methods to run statements with parameters and to retrieve statement execution results. Ordered or named parameters can be indicated as ? or <name> respectively in a SQL statement, for example:

```
SELECT name FROM Pokemons WHERE id = ?
SELECT name FROM Pokemons WHERE id = :id
```

In accordance with an embodiment, statements can be executed by calling an execute( ) method after statement parameters are set, which returns CompletionStage<R> where R is the statement execution result. The following example illustrates a JDBC query with ordered parameters that does not run in the transaction:

```
dbClient.execute(exec -> exec
    .createQuery("SELECT name FROM Pokemons WHERE id = ?")
    .params(1)
    .execute( )
);
```

While the following example illustrates a JDBC query with named parameters that does run in the transaction:

```
dbClient.inTransaction(tx -> tx
    .createQuery("SELECT name FROM Pokemons WHERE id = :id")
    .addParam("id", 1)
    .execute( )
);
```

In accordance with an embodiment, a microservices (e.g., Helidon) environment can support the use of a remote procedure call (RPC) framework or component, such as for example gRPC, which enables client and server applications to communicate within the microservices environment, to build connected systems.

Figure 6:
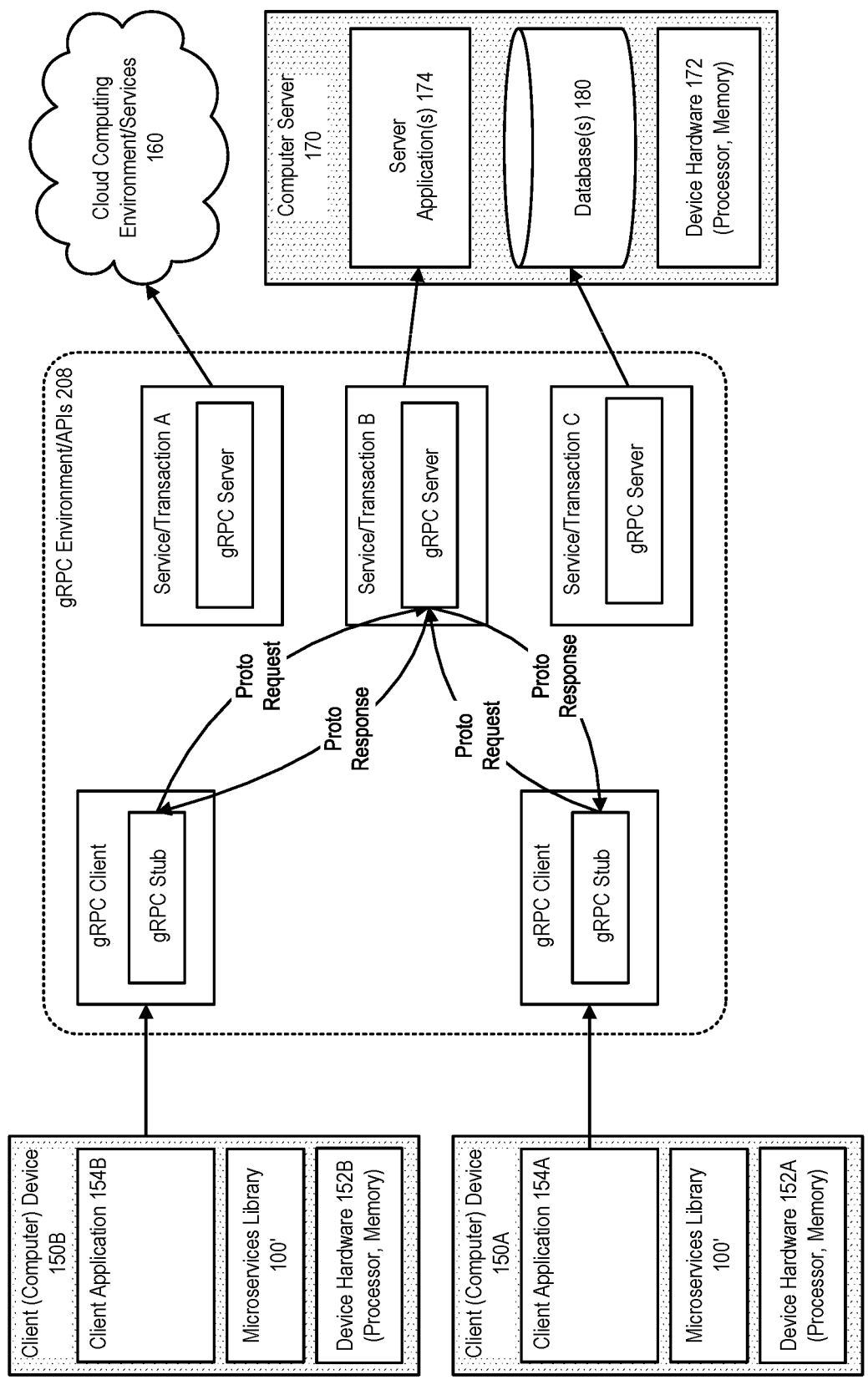
FIG. 6 illustrates the use of a remote procedure call framework, such as a gRPC framework, in a microservices environment, in accordance with an embodiment.

FIG. 6 illustrates the use of a remote procedure call framework, such as a gRPC framework, in a microservices environment, in accordance with an embodiment.

As illustrated in FIG. 6, in accordance with an embodiment, a gRPC framework provides an environment or APIs 208 that enables connection of services, with support for advanced features such as load balancing, tracing, health checking, and authentication.

Generally described, the gRPC framework uses protocol buffers as an Interface Definition Language (IDL) and message interchange format; and enables definition of a service and methods that can be called remotely. A computer server runs a gRPC server (GrpcServer) to handle client calls, via a local object (stub) at the client, which enables the client application to directly call a method on a server application as if it were a local object. Clients and servers can communicate with each other in a variety of different types of environments and supported languages, such as, for example, Java, Ruby, Android, Swift, or other types of languages.

In accordance with an embodiment, on the server side, the server implements the methods declared by the service and provides a gRPC server to handle client calls, including decoding incoming requests, executing service methods, and encoding service responses. On the client side, the client uses its local object (stub) that implements the same methods as the service, wherein the client can call those methods on the local object, wrapping the parameters for the call in an appropriate protocol buffer message type, which is then provided by gRPC as requests to the server.

Figure 7:
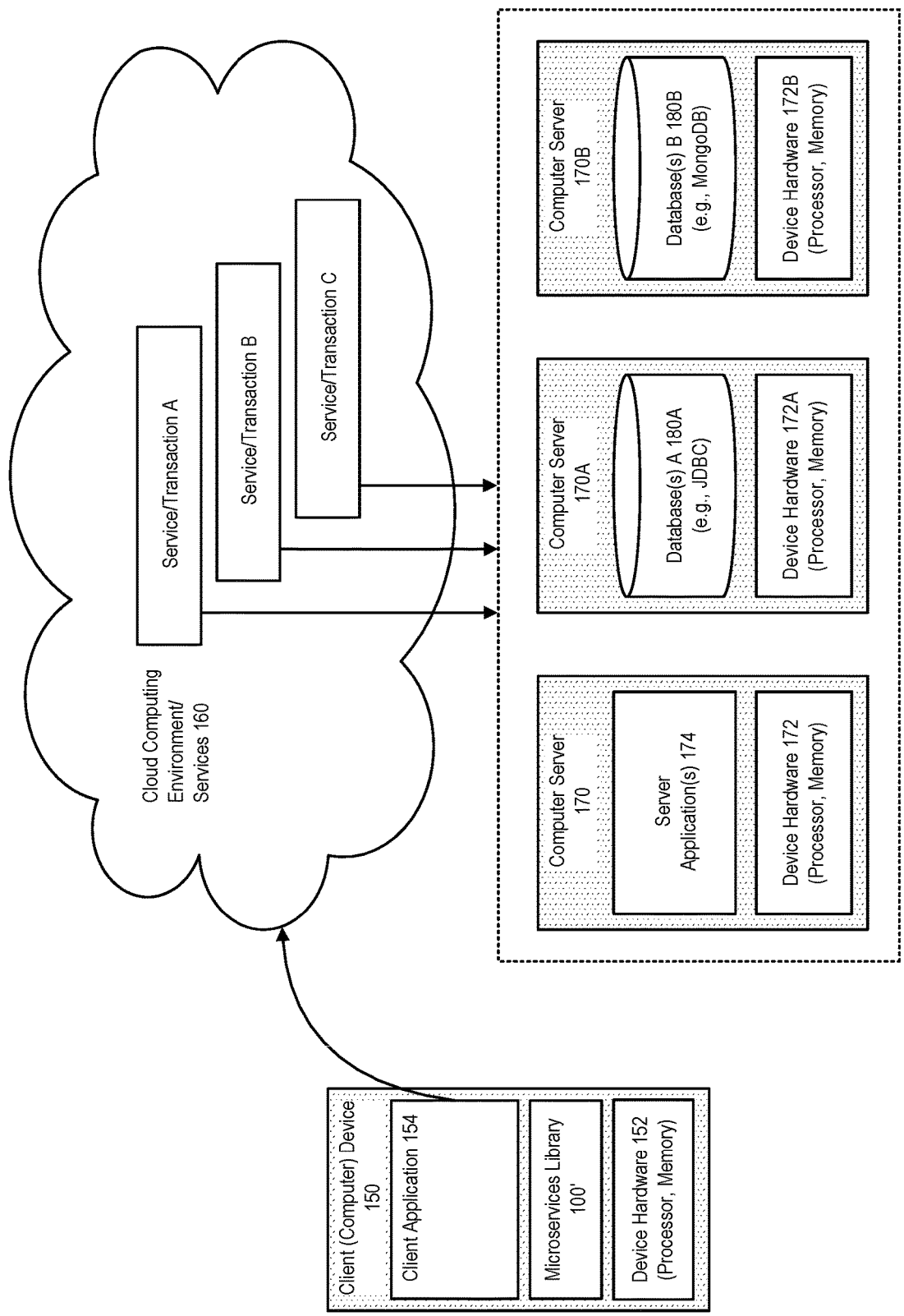
FIG. 7 further illustrates the use of a database client in a microservices environment, in accordance with an embodiment.

FIG. 7 further illustrates the use of a database client in a microservices environment, in accordance with an embodiment.

As illustrated in FIG. 7, in accordance with an embodiment, a microservices environment (microservices library) enables access by client applications, such as database clients as described above, to communicate with microservices or interact with cloud, database, or other systems or services, for purposes of accessing data, processing transactions, or performing other operations associated with those systems or services.

Reactive Messaging Client

In accordance with an embodiment, the system can include a reactive messaging API, for use with long-running activities or other types of transactions associated with microservices, which enables the system to additionally support various reactive messaging features, such as, for example, transaction processing, asynchronous messaging, reactive streams, or the use of messaging channels, in a microservices environment.

Figure 8:
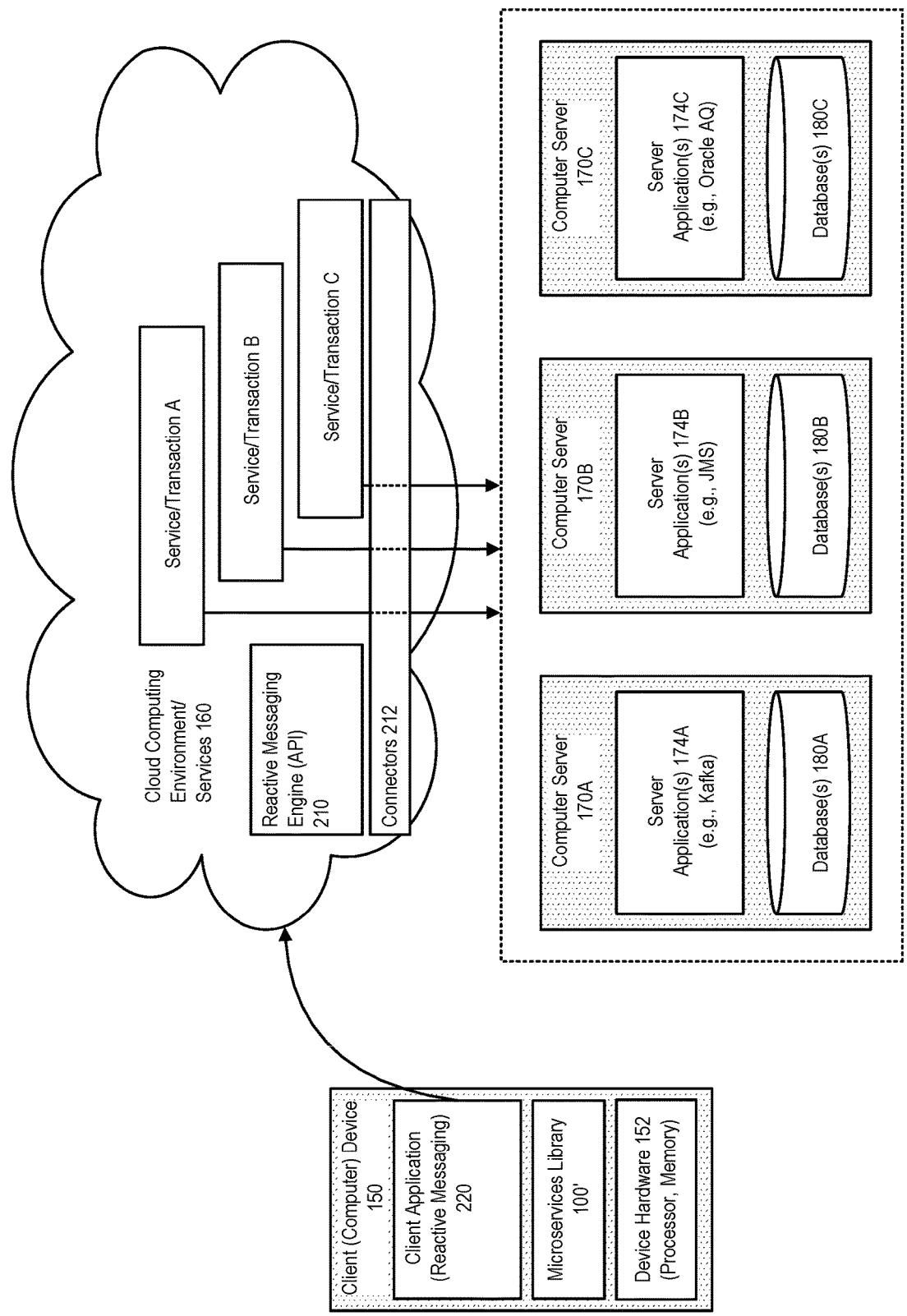
FIG. 8 illustrates the use of a reactive messaging client in microservice-oriented environments, in accordance with an embodiment.

FIG. 8 illustrates the use of a reactive messaging client in microservice-oriented environments, in accordance with an embodiment.

As illustrated in FIG. 8, in accordance with an embodiment, the system comprises a reactive engine 210 that provides a reactive messaging client API (reactive messaging API 230) and operators that can be used with reactive streams, to enable client and server applications to communicate within the microservices environment.

In accordance with an embodiment, the system comprises one or more messaging connectors (connectors) 212 adapted to provide publishers and subscribers for channels used in reactive messaging with services and/or server applications. For example, as further described below, connectors can be provided to support use of reactive messaging clients with Kafka, JMS, Oracle Advanced Queuing (Oracle AQ, AQ) which provides a message queueing service used by the Oracle Database, or other types of messaging, database, or server environments.

Figure 9:
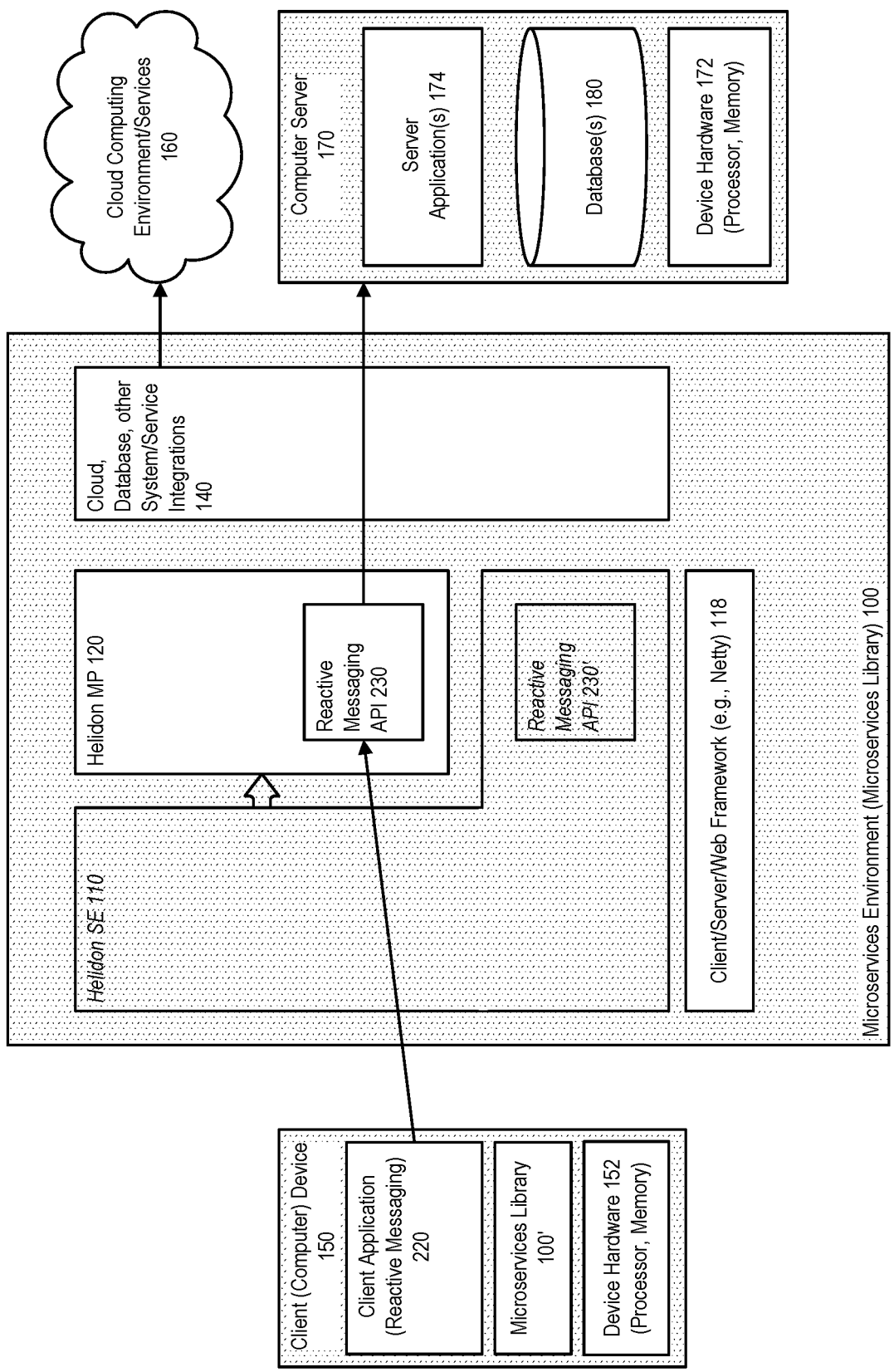
FIG. 9 further illustrates the use of a reactive messaging client in microservice-oriented environments, in accordance with an embodiment.

FIG. 9 further illustrates the use of a reactive messaging client in microservice-oriented environments, in accordance with an embodiment.

As illustrated in FIG. 9, in accordance with an embodiment, a microservices environment, for example a Helidon MP environment, can include a reactive messaging API 230, for use by (reactive messaging) client applications 220 in accessing or communicating with microservices or interacting with cloud, database, or other systems or services, for purposes of processing transactions associated with those systems or services.

In accordance with an embodiment, in a transaction environment, communication with microservices is generally message-based or event-based. For example, a first invoked method or service can be associated with a second invoked method or service, as part of a transaction; and thereafter, for example, with a third or subsequent invoked method or service.

In accordance with an embodiment, by enabling a client application to perform in a reactive manner, the application can determine, for example, how many messages it should receive at a particular time, or how many threads it needs to process those messages; which operates to reduce backpressure in the client application.

Figure 10:
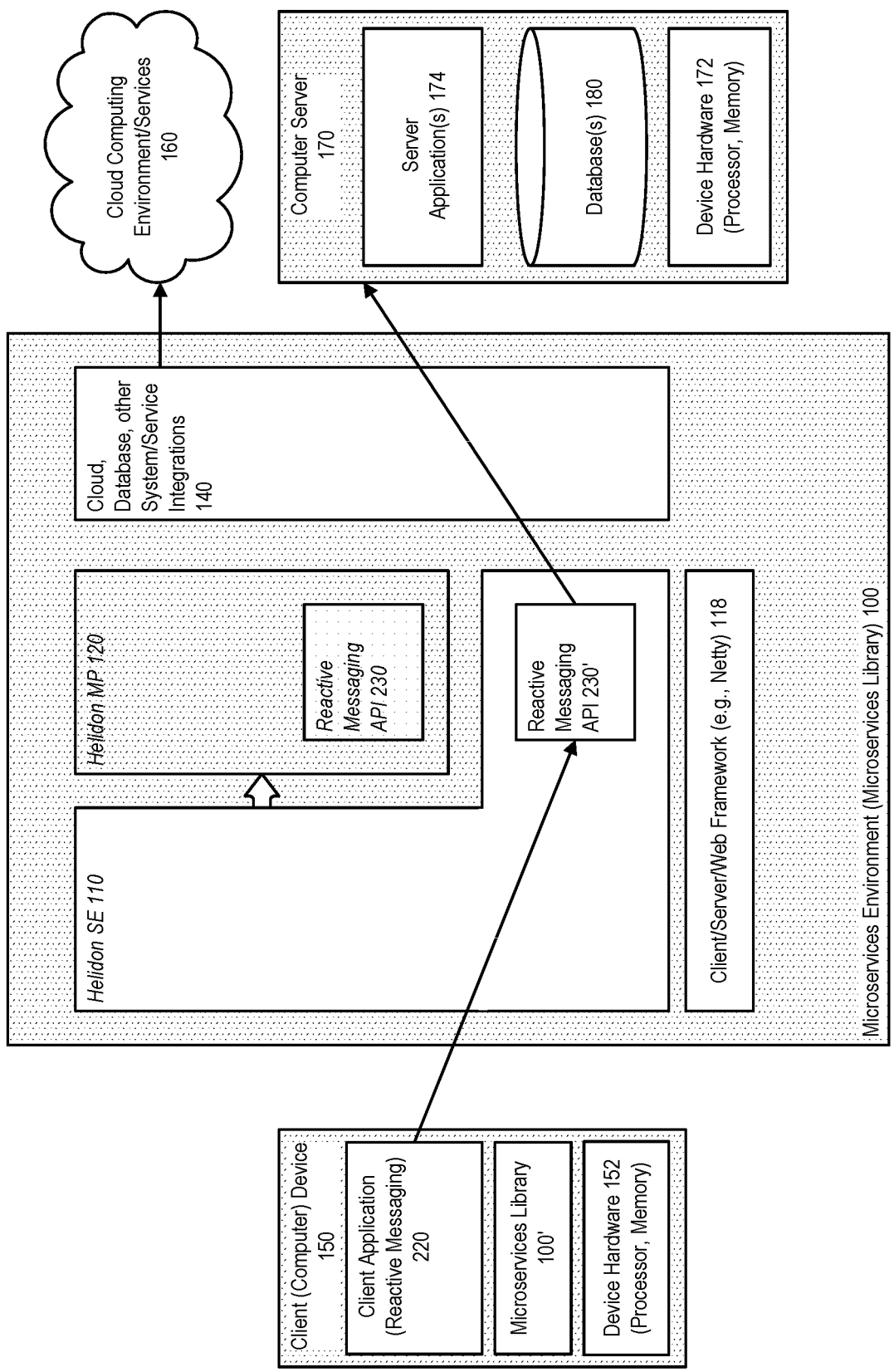
FIG. 10 further illustrates the use of a reactive messaging client in microservice-oriented environments, in accordance with an embodiment.

FIG. 10 further illustrates the use of a reactive messaging client in microservice-oriented environments, in accordance with an embodiment.

As illustrated in FIG. 10, in accordance with an embodiment, a reactive messaging API can also be developed for use in other microservices environments, such as, for example, a Helidon SE environment.

In accordance with various embodiments, the reactive messaging can support of the use connectors for use with various other environments such as, for example, Kafka, JMS, or cloud environments such as Oracle Cloud Infrastructure (OCI).

Figure 11:
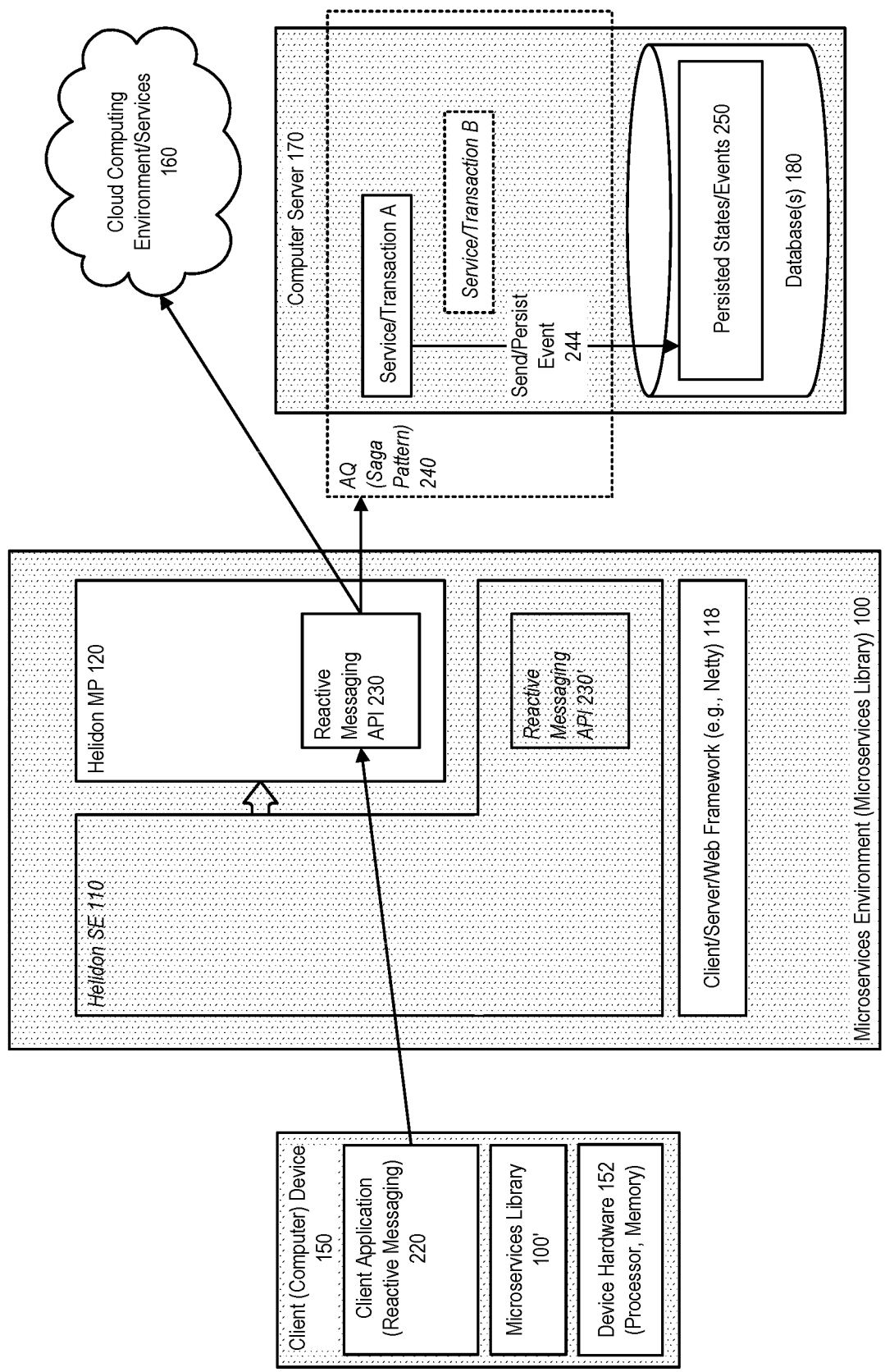
FIG. 11 further illustrates the use of a reactive messaging client in microservice-oriented environments, in accordance with an embodiment.

FIG. 11 further illustrates the use of a reactive messaging client in microservice-oriented environments, in accordance with an embodiment.

In accordance with an embodiment, a traditional transactional application environment may utilize two-phase commit and XA protocols that involve synchronous communication, locking of resources, and recovery via rollback. However, such an approach generally does not scale well in a microservices environment due to the latency of held locks.

As illustrated in FIG. 11, in accordance with an embodiment, the system supports the use of a microservices architectural pattern to implement transactions, such as, for example, features of an AQ or other database (DB) environment 240, which can use asynchronous communication and local resources, and which supports recovery through compensating actions. Such an approach scales well, and is suited for supporting long-running activities and transactions in a microservices environment.

In accordance with an embodiment, a reactive messaging client can be developed as an implementation of a MicroProfile definition, for example, as specified by the Eclipse MicroProfile project.

In accordance with an embodiment, the system supports the use of long running activities as described, for example, by the Eclipse MicroProfile Long Running Activities (LRA) API, which enables loosely-coupled services to coordinate long running activities.

In accordance with an embodiment, the system can support the operation of an LRA API with the use of a microservices architectural pattern, such as a saga pattern, in a similar manner as a Java Transaction API might support the use of two-phase commit and XA in a traditional transactional application environment.

Generally described, in accordance with an embodiment, a saga pattern can be used to enable a business transaction to span a plurality of services, such as for example, an e-commerce application that operates according to a plurality of billing or other transactional services. In such environments, the data required for a particular transaction may be controlled by different services, or stored in different databases, which prevents use of a regular two-phase commit process. The saga pattern enables a transaction to be performed as a series of local transactions, wherein each local transaction updates the database and publishes a message or event to trigger a next local transaction in the saga. If a local transaction fails, then the system executes compensating transactions to undo changes made by the preceding local transactions.

As further illustrated in FIG. 11, in accordance with an embodiment, the saga pattern operates so that persisted states/events 250 associated with transactions and services can be persisted or stored 244 locally, for example in a database such as an AQ database environment that supports the use of saga identifiers (saga ids).

Figure 12:
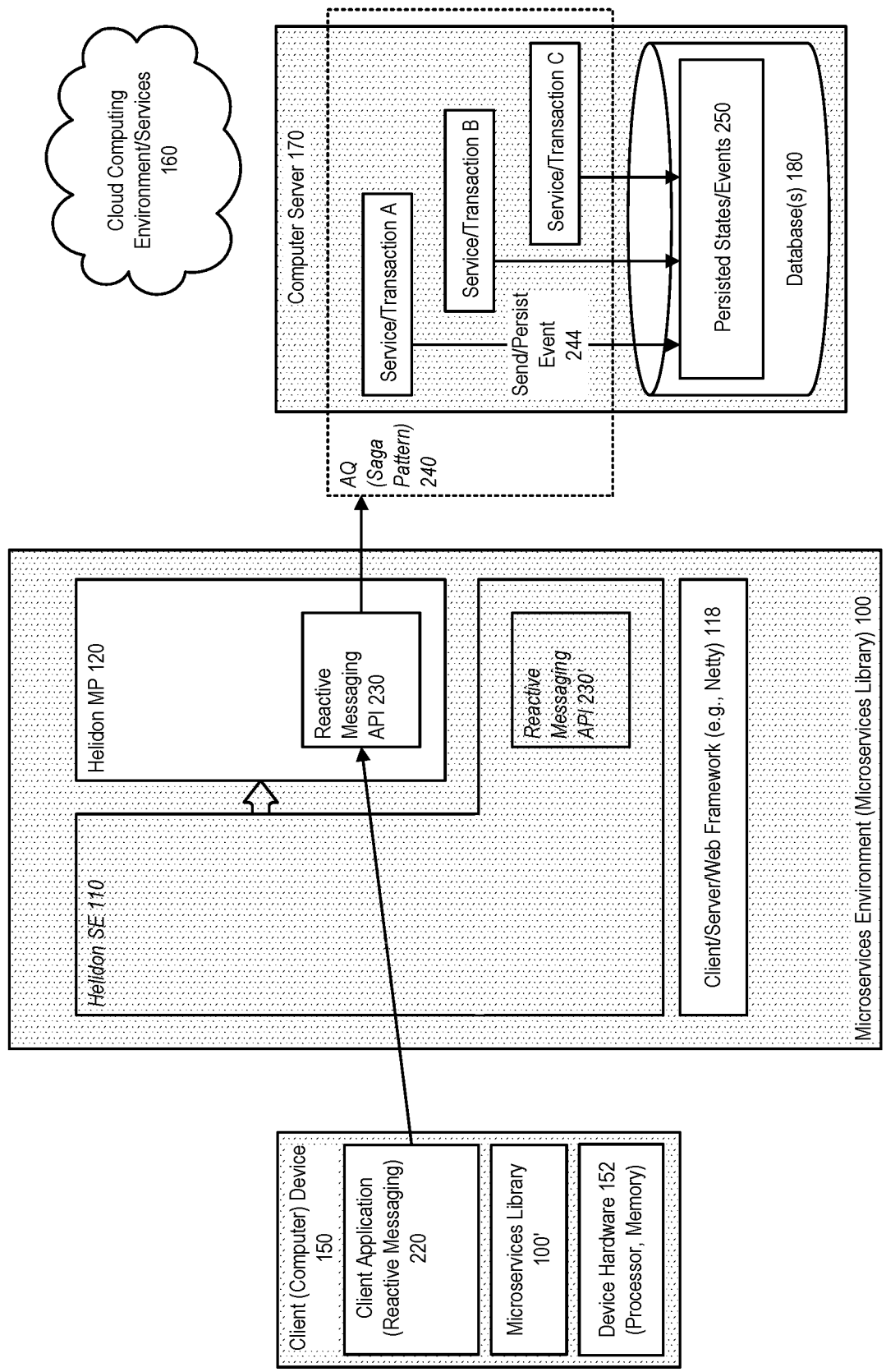
FIG. 12 further illustrates the use of a reactive messaging client in microservice-oriented environments, in accordance with an embodiment.

FIG. 12 further illustrates the use of a reactive messaging client in microservice-oriented environments, in accordance with an embodiment.

As illustrated in FIG. 12, in accordance with an embodiment, a plurality of microservices (A, B, C) can be enlisted in a long-running activity associated with a transaction, so that when the time arrives to commit the transaction, each of the microservices commit.

In accordance with an embodiment, if the system determines that the transaction must be rolled back for some reason, by performing a compensation action, then the information, including the saga ids that are associated with the services and stored at the database can be used to perform the appropriate compensation at the database itself; rather than, for example, a failure in one service requiring or causing each service to run its own compensation log. The database environment can itself determine, from the saga ids, which appropriate compensations it needs to perform, in order to fix up the transaction.

Figure 13:
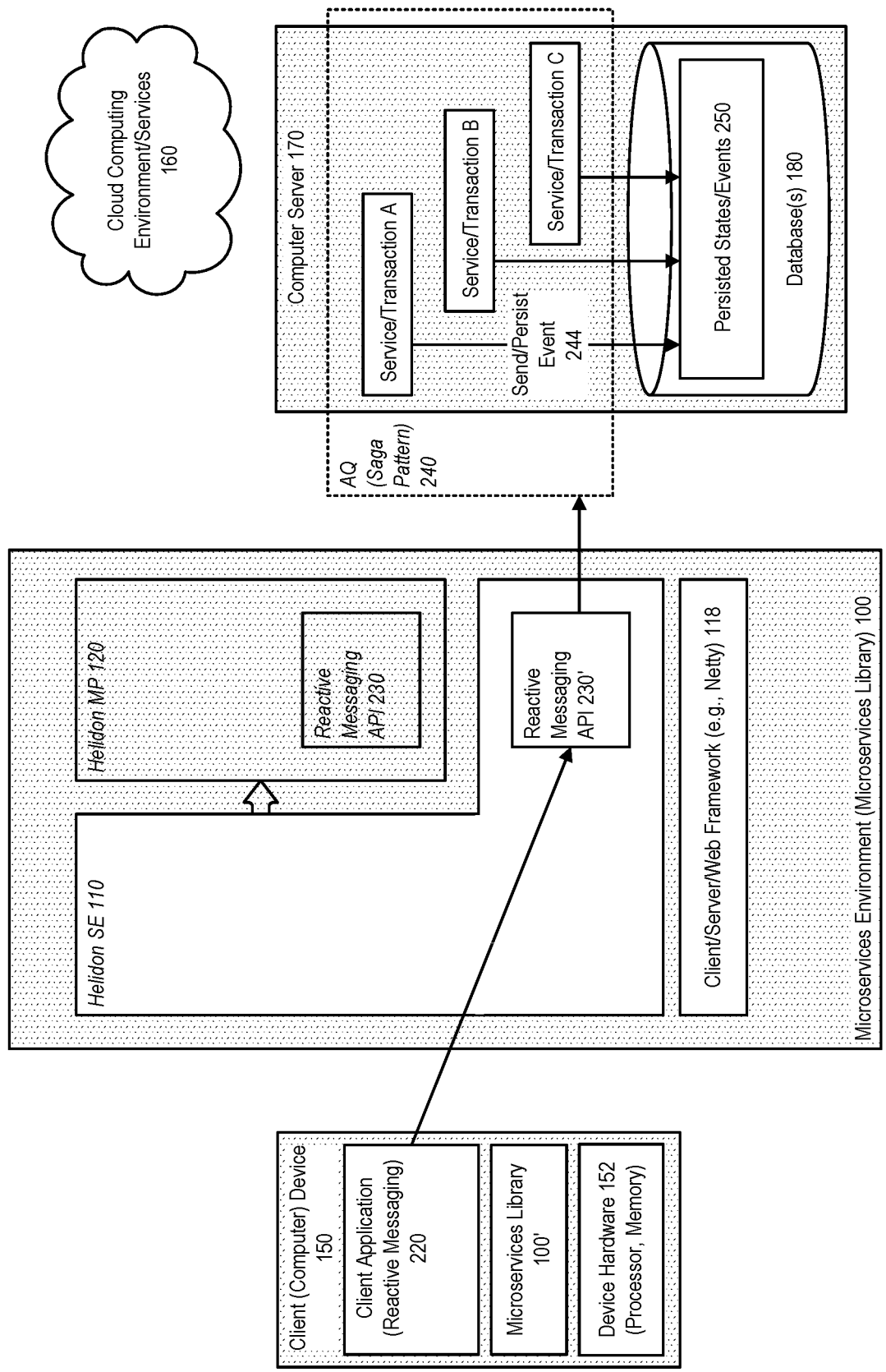
FIG. 13 further illustrates the use of a reactive messaging client in microservice-oriented environments, in accordance with an embodiment.

FIG. 13 further illustrates the use of a reactive messaging client in microservice-oriented environments, in accordance with an embodiment.

As illustrated in FIG. 13, in accordance with an embodiment, the reactive messaging API can also be used with an AQ environment that support microservices, or other microservices environments, such as, for example, a Helidon SE environment.

Figure 14:
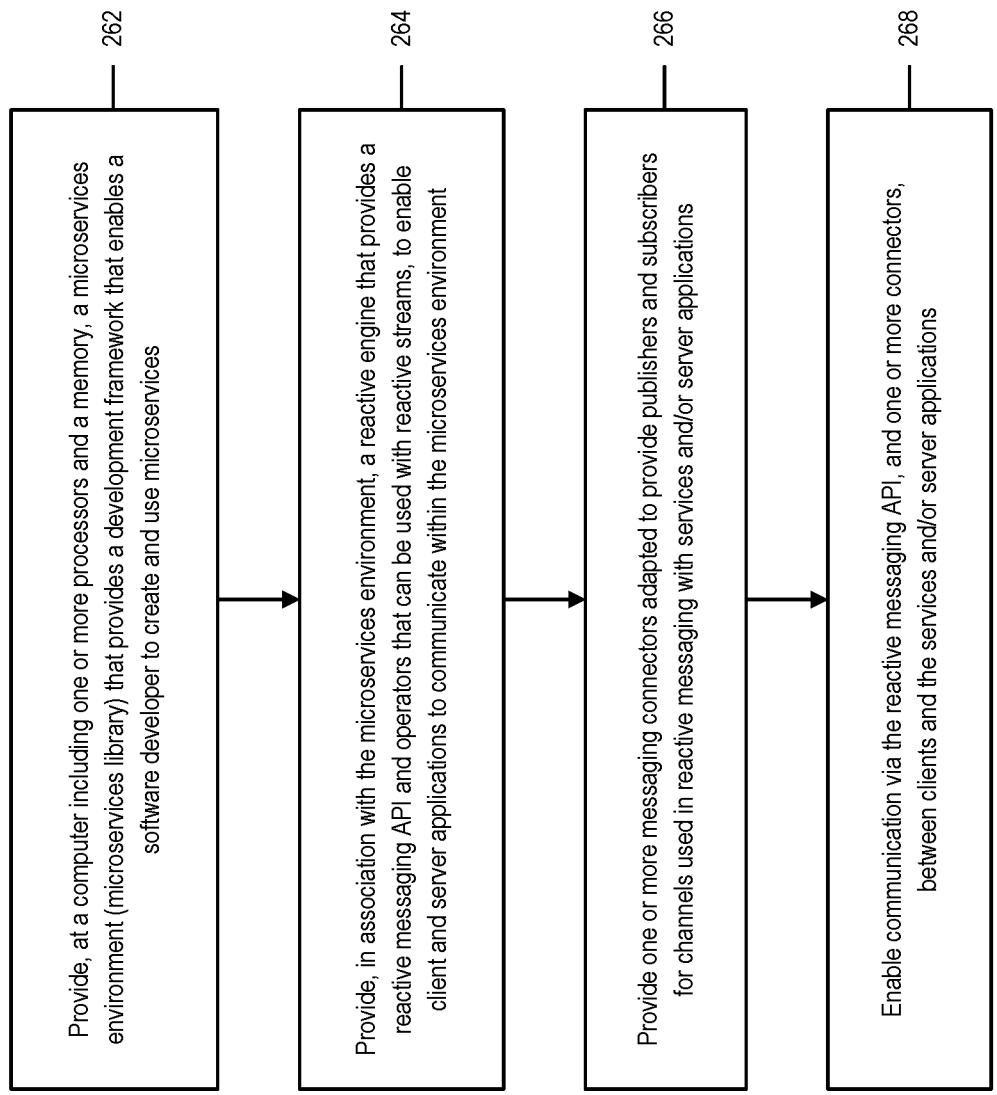
FIG. 14 illustrates a process of using reactive messaging in microservice-oriented environments, in accordance with an embodiment.

FIG. 14 illustrates a process of using reactive messaging in microservice-oriented environments, in accordance with an embodiment.

As illustrated in FIG. 14, in accordance with an embodiment, at step 262, at a computer including one or more processors and a memory, a microservices environment (microservices library) is provided, that provides a development framework that enables a software developer to create and use microservices.

At step 264, in association with the microservices environment, a reactive engine is provided, that provides a reactive messaging API and operators that can be used with reactive streams, to enable client and server applications to communicate within the microservices environment.

At step 266, one or more messaging connectors are provided, that are adapted to provide publishers and subscribers for channels used in reactive messaging with services and/or server applications.

At step 268, the system enables communication via the reactive messaging API, and one or more connectors, between clients and the services and/or server applications.

Reactive Messaging Engine (Reactive Engine)

As described above, in accordance with an embodiment, the system comprises a reactive engine that provides a reactive messaging API and operators that can be used with reactive streams, to enable client and server applications to communicate within the microservices environment.

For example, in accordance with an embodiment, the reactive engine provides a set of provides operators that can be used with java.util.concurrent.Flow based reactive streams. In such an embodiment, a stream processing operator chain can be constructed either by io.helidon.common.reactive.Multi for streams with multi value or by io.helidon.common.reactive.Single for streams with single value. In accordance with an embodiment, illustrated below is an example of the use of a multi stream processing operator chain:

```
AtomicInteger sum = new AtomicInteger( );
Multi.just("1", "2", "3", "4", "5")
    .limit(3)
    .map(Integer::parseInt)
    .forEach(sum::addAndGet);
System.out.println("Sum: " + sum.get( ));
> Sum: 6
```

In accordance with an embodiment, illustrated below is an example of the use of a single stream processing operator chain:

```
Single.just("1")
    .map(Integer::parseInt)
    .map(i -> i + 5)
    .toStage( )
    .whenComplete((i, t) -> System.out.println("Result: " + i));
> Result: 6
```

Table 1 illustrates examples of reactive operators supported by the system, in accordance with an embodiment. The examples provided therein are provided for purposes of illustration; in accordance with various embodiments, other types of reactive operators can be supported.

TABLE 1

| | |
|---|---|
| Defer | Call the given supplier function for each individual downstream Subscriber to return a Flow.Publisher to subscribe to. |
| Map | Map this Multi instance to a new Multi of another type using the given Mapper. |
| defaultIfEmpty | Signals the default item if the upstream is empty. |
| switchIfEmpty | Switch to the other publisher if the upstream is empty. |
| Peek | Invoke provided consumer for every item in stream. |
| distinct | Filter out all duplicates. |
| filter | Filter stream items with provided predicate. |
| takeWhile | Take the longest prefix of elements from this stream that satisfy the given predicate. As long as predicate returns true, items from upstream are sent to downstream, when predicate returns false stream is completed. |
| dropWhile | Drop the longest prefix of elements from this stream that satisfy the given predicate. As long as predicate returns true, items from upstream are NOT sent to downstream but being dropped, predicate is never called again after it returns false for the first time. |
| limit | Limit stream to allow only specified number of items to pass. |
| skip | Skip first n items, all the others are emitted. |
| flatMap | Transform each upstream item with the supplied function into a Flow.Publisher, subscribe to them and then flatten their items into a single sequence of items emitted to the downstream. Transform each upstream item with the supplied function and flatten the resulting Flow.Publisher to downstream while limiting the maximum number of concurrent inner 'Flow.Publisher's and their in-flight item count, optionally aggregating and delaying all errors until all sources terminate. |
| flatMapIterable | Transform each upstream item with the supplied function and flatten the resulting Iterable to the downstream. |
| forEach | Terminal stage, invokes provided consumer for every item in the stream. |
| collectList | Collect the items of this Multi instance into a Single of List. |
| collect | Collect the items of this Multi instance into a Single. Collect the items of this Multi into a collection provided via a Supplier and mutated by a BiConsumer callback. |
| collectStream | Collects up upstream items with the help of the callbacks of a java.util.stream.Collector. |
| Reduce | Combine subsequent items via a callback function and emit the final value result as a Single. Combine every upstream item with an accumulator value to produce a new accumulator value and emit the final accumulator value as a Single. |
| First | Get the first item of this Multi instance as a Single. |
| From | Wrap a CompletionStage into a Multi and signal its outcome non-blockingly. Create a Multi instance wrapped around the given publisher. Create a Multi instance that publishes the given iterable. Create a Multi instance that publishes the given Stream. |
| Just | Create a Multi instance that publishes the given items to a single subscriber. |
| Singleton | Create a Multi that emits a pre-existing item and then completes. |
| Error | Create a Multi instance that reports the given exception to its subscriber(s). The exception is reported by invoking Subscriber#onError(java.lang.Throwable) when Publisher#subscribe(Subscriber) is called. |
| Empty | Get a Multi instance that completes immediately. |
| Never | Get a Multi instance that never completes. |
| Concat | Concat streams to one. |
| onTerminate | Executes given java.lang.Runnable when any of signals onComplete, onCancel or onError is received. |
| onComplete | Executes given java.lang.Runnable when onComplete signal is received. |
| onError | Executes the given java.util.function.Consumer when an onError signal is received. |
| onCancel | Executes given java.lang.Runnable when a cancel signal is received. |
| takeUntil | Relay upstream items until the other source signals an item or completes. |
| range | Emits a range of ever increasing integers. |
| rangeLong | Emits a range of ever increasing longs. |
| timer | Signal 0L and complete the sequence after the given time elapsed. |
| interval | Signal 0L, 1L and so on periodically to the downstream. Signal 0L after an initial delay, then 1L, 2L and so on periodically to the downstream. |
| timeout | Signals a TimeoutException if the upstream doesn't signal the next item, error or completion within the specified time. Switches to a fallback source if the upstream doesn't signal the next item, error or completion within the specified time. |
| onErrorResume | java.util.function.Function providing one item to be submitted as onNext in case of onError signal is received. |
| onErrorResumeWith | Resume stream from supplied publisher if onError signal is intercepted. |
| retry | Retry a failing upstream at most the given number of times before giving up. Retry a failing upstream if the predicate returns true. |
| retryWhen | Retry a failing upstream when the given function returns a publisher that signals an item. |

Operator Chains

In accordance with an embodiment, when part of the operator chain needs to be prepared in advance, then a selection of compose and to operators can be used. In accordance with an embodiment, illustrated below is an example of combining operator chains:

```
// Assembly of stream, nothing is streamed yet
Multi<String> publisherStage =
    Multi.just("foo", "bar")
        .map(String::trim);
Function<Multi<T>, Multi<T>> processorStage =
    upstream ->
        upstream.map(String::toUpperCase);
```

-continued

```
// Execution of pre-prepared stream
publisherStage
    .compose(processorStage)
    .map(s -> "Item received: " + s)
    .forEach(System.out::println);
> Item received: FOO
> Item received: BAR
```

In accordance with an embodiment, to enable the use of reactive engine with a software project, the following dependency can be declared in the project:

```
<dependency>
    <groupId>io.helidon.common</groupId>
    <artifactId>helidon-common-reactive</artifactId>
</dependency>
```

Reactive Streams Operators

In accordance with an embodiment, the system provides an implementation of the MicroProfile Reactive Streams Operators Specification, as prepared by the Eclipse Foundation; which defines a standardized approach to manipulation of data with reactive streams, operators for use with stages, and the use of builders to prepare graphs of stages from which streams can be built. In accordance with an embodiment, illustrated below is an example of a closed graph usage:

```
AtomicInteger sum = new AtomicInteger( );
ReactiveStreams.of("1", "2", "3", "4", "5")
    .limit(3)
    .map(Integer::parseInt)
    .forEach(sum::addAndGet)
    .run( )
    .whenComplete((r, t) -> System.out.println("Sum: " + sum.get( )));
> Sum: 6
```

Table 2 illustrates examples of supported operators for use with stages, in accordance with an embodiment. The examples provided therein are provided for purposes of illustration; in accordance with various embodiments, other types of reactive operators can be supported.

TABLE 2

| | |
|---|---|
| fromIterable | Create new PublisherBuilder from supplied Iterable. |
| Of | Create new PublisherBuilder emitting supplied elements. |
| ofNullable | Empty stream if supplied item is null. |
| Iterate | Create infinite stream with every next item created by supplied operator from previous item. |
| generate | Create infinite stream with every item created by invocation of supplier. |
| empty | Create new PublisherBuilder emitting as a first thing complete signal. |
| failed | Create new PublisherBuilder emitting as a first thing error signal. |
| concat | Concat two streams. |
| coupled | Two parallel streams sharing cancel, onError and onComplete signals. |
| limit | Limit the size of the stream, when limit is reached completes. |
| Peek | Invoke consumer for every item passing this operator. |
| Filter | Drop item when expression result to false. |
| Map | Transform items. |
| flatMap | Flatten supplied stream to current stream. |
| flatMapIterable | Flatten supplied iterable to current stream. |
| flatMapCompletionStage | Map elements to completion stage and wait for each to be completed, keeps the order. |
| flatMapRSPublisher | Map elements to Publishers and flatten this sub streams to original stream. |
| takeWhile | Let items pass until expression is true, first time its false completes. |
| dropWhile | Drop items until expression is true, first time its false let everything pass. |
| Skip | Drop first n items. |
| Distinct | Let pass only distinct items. |
| Via | Connect supplied processor to current stream return supplied processor. |
| onError | Invoke supplied consumer when onError signal received. |
| onErrorResume | Emit one last supplied item when onError signal received. |
| onErrorResumeWith | When onError signal received continue emitting from supplied publisher builder. |
| onErrorResumeWithRsPublisher | When onError signal received continue emitting from supplied publisher. |
| onComplete | Invoke supplied runnable when onComplete signal received. |
| onTerminate | Invoke supplied runnable when onComplete or onError signal received. |
| to | Connect this stream to supplied subscriber. |
| toList | Collect all intercepted items to List. |
| collect | Collect all intercepted items with provided collector. |
| forEach | Invoke supplied Consumer for each intercepted item. |
| ignore | Ignore all onNext signals, wait for onComplete. |
| reduce | Reduction with provided expression. |
| Cancel | Cancel stream immediately. |
| findFirst | Return first intercepted element. |

Graphs

In accordance with an embodiment, graphs are pre-prepared stream builders with stages, which can be combined together to form a closed graph with methods via and to. In accordance with an embodiment, illustrated below is an example of combining graphs and running a stream:

```
// Assembly of stream, nothing is streamed yet
PublisherBuilder<String> publisherstage =
    ReactiveStreams.of("foo", "bar")
        .map(String::trim);
ProcessorBuilder<String, String> processorStage =
    ReactiveStreams.<String>builder( )
        .map(String::toUpperCase);
SubscriberBuilder<String, Void> subscriberStage =
    ReactiveStreams.<String>builder( )
        .map(s -> "Item received: " + s)
        .forEach(System.out::println);
// Execution of pre-prepared stream
```

```
    publisherStage
        .via(processorStage)
        .to(subscriberStage).run( );
> Item received: FOO
> Item received: BAR
```

In accordance with an embodiment, to enable the use of MicroProfile reactive streams (as defined by the MicroProfile Reactive Streams Operators Specification) with a software project, the following dependency can be declared in the project:

```
<dependency>
    <groupId>io.helidon.microprofile.reactive-streams</groupId>
    <artifactId>helidon-microprofile-reactive-streams</artifactId>
</dependency>
```

Helidon SE Reactive Messaging

As described above, in accordance with an embodiment, a microservices environment (microservices library) can be provided as one or more software libraries, such as for example a Helidon SE programming model or environment.

Asynchronous messaging is a commonly used form of communication in microservices environments. While it is possible to build reactive streams directly by combining operators and connecting them to reactive APIs, in accordance with an embodiment, the system provides additional tools to address various use cases.

For example, connecting streams to external services often requires a lot of boiler-plate code for configuration handling, backpressure propagation, acknowledgement and more. In accordance with an embodiment, to support such tasks, the system provides a plurality of connectors, emitters, and means to orchestrate. When provided as a reactive messaging API, the system allows for connecting and configuring connectors and emitters with reactive streams through channels.

In accordance with an embodiment, an embodiment of the system that supports Helidon SE reactive messaging supports the same configuration format for connectors as its MicroProfile counterpart. For Example, Helidon MP connectors are usable in Helidon SE reactive messaging, with some limitation (for example, there is no CDI in Helidon SE).

Channel

In accordance with an embodiment, a channel is a named pair of Publisher and Subscriber. Channels can be connected together by processors. The registering of a Publisher or Subscriber for a channel can be provided by the reactive messaging API, or can be configured implicitly for using a registered connector for generating such Publisher or Subscriber. In accordance with an embodiment, illustrated below is an example of a simple channel configuration:

```
Channel<String> channel1 = Channel.create("channel1");
Messaging.builder( )
    .publisher(channel1, Multi.just("message 1", "message 2"))
    .map(Message::of))
        .listener(channel1, s -> System.out.println("Intecepted
        message" + s))
        .build( )
        .start( );
```

Processor

In accordance with an embodiment, a processor operates as a typical reactive processor, in that it acting as a Subscriber to upstream components and as a Publisher to downstream components. In terms of reactive messaging, a processor can connect two channels to one reactive stream. In accordance with an embodiment, illustrated below is an example of a processor usage:

```
Channel<String> firstChannel = Channel.create("first-channel");
Channel<String> secondChannel = Channel.create("second-channel");
Messaging.builder( )
    .publisher(secondChannel, ReactiveStreams.of("test1", "test2",
    "test3")
        .map(Message::of))
    .processor(secondChannel, firstChannel,
ReactiveStreams.<Message<String>>builder( )
        .map(Message::getPayload)
        .map(String::toUpperCase)
        .map(Message::of)
    )
    .subscriber(firstChannel,
    ReactiveStreams.<Message<String>>builder( )
        .peek(Message::ack)
        .map(Message::getPayload)
        .forEach(s -> System.out.println("Consuming message " + s)))
    .build( )
    .start( );
>Consuming message TEST1
>Consuming message TEST2
>Consuming message TEST3
```

Message

In accordance with an embodiment of the system that supports Helidon SE reactive messaging, the system uses the same concept of message wrapping as MicroProfile messaging; with a difference being that SE reactive messaging provides almost no implicit or automatic acknowledgement. An additional difference is with regard to variants of methods Messaging.Builder#listener and Messaging.Builder#processor with consumer or function params, which conveniently unwrap payload. After such implicit unwrapping is not possible to perform a manual acknowledgement, therefore an implicit acknowledgement (ack) before the callback is executed is necessary.

Messaging Connector

As described above, in accordance with an embodiment, the system comprises one or more messaging connectors adapted to provide publishers and subscribers for channels used in reactive messaging with services and/or server applications.

For example, in accordance with an embodiment, the system can includes a connector that provides a means or connecting channels to external sources. To make creation and usage of connectors as easy and versatile as possible, an embodiment of the system that supports Helidon SE reactive messaging uses the same API for connectors as MicroProfile reactive messaging. This allows connectors to be usable in both variants of Helidon (although as indicated above, with the limitation that connector has to be able to work without CDI). Examples of such connectors include a Kafka connector; a JMS connector; and/or an AQ connector, examples of which are further described below.

In accordance with an embodiment, to enable the use of reactive messaging in a software project, the following dependency can be declared in the project:

```
<dependency>
    <groupId>io.helidon.messaging</groupId>
    <artifactId>helidon-messaging</artifactId>
</dependency>
```

In accordance with an embodiment, a messaging connector (connector) for reactive messaging can be provided as a factory producing publishers and subscribers for channels used in reactive messaging. A messaging connector can be provided as an implementation of IncomingConnectorFactory, OutgoingConnectorFactory or both. In accordance with an embodiment, illustrated below is an example of a connector example-connector:

```
@Connector("example-connector")
public class ExampleConnector implements IncomingConnectorFactory,
OutgoingConnectorFactory {
    @Override
    public PublisherBuilder<? extends Message<?>>
    getPublisherBuilder(Config config) {
        return ReactiveStreams.of("foo", "bar")
            .map(Message::of);
    }
    @Override
    public SubscriberBuilder<? extends Message<?>, Void>
    getSubscriberBuilder(Config
config) {
        return ReactiveStreams.<Message<?>>builder( )
            .map(Message::getPayload)
            .forEach(o -> System.out.println("Connector says: " + o));
    }
}
```

In accordance with an embodiment, illustrated below is an example of a channel to connector mapping configuration:

```
mp.messaging.outgoing.to-connector-channel.connector:
example-connector
mp.messaging.incoming.from-connector-channel.connector:
example-connector
```

In accordance with an embodiment, illustrated below is an example of producing messages to a connector:

```
Messaging.builder( )
    .connector(new ExampleConnector( ))
    .publisher(Channel.create("to-connector-channel"),
        ReactiveStreams.of("fee", "fie")
            .map(Message::of)
    )
    .build( )
    .start( );
> Connector says: fee
> Connector says: fie
```

In accordance with an embodiment, illustrated below is an example of consuming messages from a connector:

```
Messaging.builder( )
    .connector(new ExampleConnector( ))
    .subscriber(Channel.create("from-connector-channel"),
        ReactiveStreams.<Message<String>>builder( )
            .peek(Message::ack)
            .map(Message::getPayload)
            .forEach(s -> System.out.println("Consuming: " + s))
    )
```

```
    .build( )
    .start( );
> Consuming: foo
> Consuming: bar
```

Configuration

In accordance with an embodiment of the system that supports Helidon SE reactive messaging, a messaging connector can be configured either explicitly by an API, or implicitly by a configuration notation of MicroProfile reactive messaging. When configuration is supplied to a connector by the messaging implementation, there are two mandatory attributes:

A channel-name name of the channel which has this connector configured as Publisher or Subscriber, for example as Channel.create('name-of-channel') in the case of explicit configuration or as mp.messaging.incoming.name-of-channel.connector: connector-name in case of implicit configuration.

A connector name of the connector @Connector ("connector-name")

In accordance with an embodiment, illustrated below is an example of a connector accessing a configuration:

```
@Connector("example-connector")
public class ExampleConnector implements IncomingConnectorFactory {
    @Override
    public PublisherBuilder<? extends Message<?>>
    getPublisherBuilder(final Config
config) {
        String firstPropValue = config.getValue("first-test-prop",
            String.class);
        String secondPropValue = config.getValue("second-test-prop",
            String.class);
        return ReactiveStreams.of(firstPropValue, secondPropValue)
            .map(Message::of);
    }
}
```

In accordance with an embodiment, a configuration context is merged from channel and connector contexts.

Explicit Configuration

In accordance with an embodiment, an explicit configuration for a channel's publisher can be provided by Channel.Builder#publisherConfig(Config config), and for a channel's subscriber with Channel.Builder#subscriberConfig(Config config). The Helidon-supplied configuration is merged with mandatory attributes and any implicit configuration that is found. The resulting configuration is then served to the connector. In accordance with an embodiment, illustrated below is an example of consuming messages from a Kafka connector with explicit configuration:

```
String kafkaServer = config.get("app.kafka.bootstrap.servers").asString( ).get( );
String topic = config.get("app.kafka.topic").asString( ).get( );
Channel<String> fromKafka = Channel.<String>builder( )
    .name("from-kafka")
    .publisherConfig(KafkaConnector.configBuilder( )
            .bootstrapServers(kafkaServer)
            .groupId("example-group-" + session.getId( ))
            .topic(topic)
            .autoOffsetReset(KafkaConfigBuilder.AutoOffsetReset.LATEST)
            .enableAutoCommit(true)
            .keyDeserializer(StringDeserializer.class)
            .valueDeserializer(StringDeserializer.class)
            .build( )
    )
    .build( );
KafkaConnector kafkaConnector = KafkaConnector.create( );
Messaging messaging = Messaging.builder( )
    .connector(kafkaConnector)
    .listener(fromKafka, payload -> {
        System.out.println("Kafka says: " + payload);
    })
    .build( )
    .start( );
```

In accordance with an embodiment, the above example illustrates how the system can be used to: prepare a channel for connecting a Kafka connector with a specific publisher configuration→listener; provide a configuration channel→connector mapping which is automatic when using KafkaConnector.configBuilder( ); and prepare a Kafka connector which can be used by any channel.

Implicit Configuration

In accordance with an embodiment, implicit configuration without any hard-coding can be provided following the notation of MicroProfile reactive messaging. In accordance with an embodiment, illustrated below is an example of channel to connector mapping configuration with custom properties:

```
mp.messaging.incoming.from-connector-channel.connector:
example-connector
mp.messaging.incoming.from-connector-channel.first-test-prop: foo
mp.messaging.connector.example-connector.second-test-prop: bar
```

In accordance with an embodiment, the above example illustrates how the system can be used to: provide a channel→connector mapping; provide channel configuration properties; and provide connector configuration properties.

In accordance with an embodiment, illustrated below is an example of consuming messages from a connector:

```
Messaging.builder( )
    .connector(new ExampleConnector( ))
    .listener(Channel.create("from-connector-channel"),
        s -> System.out.println("Consuming: " + s))
```

-continued

```
    .build( )
    .start( );
> Consuming: foo
> Consuming: bar
```

Reusability in MP Messaging

In accordance with an embodiment, as the reactive messaging API is the same for MicroProfile reactive messaging connectors, all that is needed to make a connector work in both environments is annotating it with @ApplicationScoped. Such a connector can be treated as a bean in Helidon MP.

Reactive Kafka Connector

In accordance with an embodiment of the system that supports Helidon SE reactive messaging, the system can be used to connect streams to a Kafka environment with reactive messaging, as described below.

```
<dependency>
    <groupId>io.helidon.messaging</groupId>
    <artifactId>helidon-messaging</artifactId>
</dependency>
<dependency>
    <groupId>io.helidon.messaging.kafka</groupId>
    <artifactId>helidon-messaging-kafka</artifactId>
</dependency>
```

Explicit Configuration (Configuration Builder)

In accordance with an embodiment, illustrated below is an example of how the system can be explicitly configured to consume messages from a Kafka environment:

```
String kafkaServer = config.get("app.kafka.bootstrap.servers").asString( ).get( );
String topic = config.get("app.kafka.topic").asString( ).get( );
Channel<String> fromKafka = Channel.<String>builder( )
    .name("from-kafka")
    .publisherConfig(KafkaConnector.configBuilder( )
            .bootstrapServers(kafkaServer)
            .groupId("example-group-" + session.getId( ))
            .topic(topic)
            .autoOffsetReset(KafkaConfigBuilder.AutoOffsetReset.LATEST)
            .enableAutoCommit(true)
```

```
            .keyDeserializer(StringDeserializer.class)
            .valueDeserializer(StringDeserializer.class)
            .build( )
    )
    .build( );
KafkaConnector kafkaConnector = KafkaConnector.create( );
Messaging messaging = Messaging.builder( )
    .connector(kafkaConnector)
    .listener(fromKafka, payload −> {
        System.out.println("Kafka says: " + payload);
    })
    .build( )
    .start( );
```

In accordance with an embodiment, the above example illustrates how the system can be used to: prepare a channel for connecting Kafka connector with specific publisher configuration→listener; channel→connector mapping is automatic when using KafkaConnector.configBuilder( ); and prepare a Kafka connector, which can be used by any channel.

In accordance with an embodiment, illustrated below is an example of how the system can be explicitly configured to produce messages to a Kafka environment:

```
String kafkaServer =
config.get("app.kafka.bootstrap.servers").asString( ).get( );
String topic = config.get("app.kafka.topic").asString( ).get( );
Channel<String> toKafka = Channel.<String>builder( )
        .subscriberConfig(KafkaConnector.configBuilder( )
            .bootstrapServers(kafkaServer)
            .topic(topic)
            .keySerializer(StringSerializer.class)
            .valueSerializer(StringSerializer.class)
            .build( )
        ).build( );
KafkaConnector kafkaConnector = KafkaConnector.create( );
messaging = Messaging.builder( )
    .publisher(toKafka, Multi.just("test1", "test2").map(Message::of))
    .connector(kafkaConnector)
    .build( )
    .start( );
```

In accordance with an embodiment, the above example illustrates how the system can be used to: prepare a channel for connecting Kafka connector with specific publisher configuration→listener; channel→connector mapping is automatic when using KafkaConnector.configBuilder( ); and prepare a Kafka connector, which can be used by any channel.

Implicit (Helidon) Configuration

In accordance with an embodiment, illustrated below is an example of how the system can be implicitly configured to operate with Kafka:

```
mp.messaging:
    incoming.from-kafka:
        connector: helidon-kafka
        topic: messaging-test-topic-1
        auto.offset.reset: latest
        enable.auto.commit: true
        group.id: example-group-id
    outgoing.to-kafka:
        connector: helidon-kafka
        topic: messaging-test-topic-1
    connector:
        helidon-kafka:
            bootstrap.servers: localhost:9092
            key.serializer:
                org.apache.kafka.common.serialization.StringSerializer
            value.serializer:
                org.apache.kafka.common.serialization.StringSerializer
            key.deserializer:
                org.apache.kafka.common.serialization.StringDeserializer
            value.deserializer:
                org.apache.kafka.common.serialization.StringDeserializer
```

In accordance with an embodiment, illustrated below is an example of how the system can be implicitly configured to consume messages from a Kafka environment:

```
Channel<String> fromKafka = Channel.create("from-kafka");
KafkaConnector kafkaConnector = KafkaConnector.create( );
Messaging messaging = Messaging.builder( )
    .connector(kafkaConnector)
    .listener(fromKafka, payload −> {
        System.out.println("Kafka says: " + payload);
    })
    .build( )
    .start( );
```

In accordance with an embodiment, the above example illustrates how the system can be used to: prepare a Kafka connector, which can be used by any channel.

In accordance with an embodiment, illustrated below is an example of how the system can be implicitly configured to produce messages to a Kafka environment:

```
Channel<String> toKafka = Channel.create("to-kafka");
KafkaConnector kafkaConnector = KafkaConnector.create( );
messaging = Messaging.builder( )
    .publisher(toKafka, Multi.just("test1", "test2").map(Message::of))
    .connector(kafkaConnector)
    .build( )
    .start( );
```

In accordance with an embodiment, the above example illustrates how the system can be used to: prepare a Kafka connector, which can be used by any channel.

Reactive JMS Connector

In accordance with an embodiment of the system that supports Helidon SE reactive messaging, the system can be used to connect streams to a JMS environment with reactive messaging, as described below.

```
<dependency>
    <groupId>io.helidon.messaging</groupId>
    <artifactId>helidon-messaging</artifactId>
</dependency>
```

```
<dependency>
    <groupId>io.helidon.messaging.jms</groupId>
    <artifactId>helidon-messaging-jms</artifactId>
</dependency>
```

Explicit Configuration (Configuration Builder)

In accordance with an embodiment, illustrated below is an example of how the system can be explicitly configured to consume messages from a JMS environment:

```
Channel<String> fromJms = Channel.<String>builder( )
    .name("from-jms")
    .publisherConfig(JmsConnector.configBuilder( )
        .jndiInitialFactory(ActiveMQInitialContextFactory.class)
        .jndiProviderUrl("tcp://127.0.0.1:61616")
        .type(JmsConfigBuilder.Type.QUEUE)
        .destination("se-example-queue-1")
        .build( )
    )
    .build( );
JmsConnector jmsConnector = JmsConnector.create( );
Messaging messaging = Messaging.builder( )
    .connector(jmsConnector)
    .listener(fromJms, payload -> {
        System.out.println("Jms says: " + payload);
    })
    build( )
    .start( );
```

In accordance with an embodiment, the above example illustrates how the system can be used to: prepare a channel for connecting JMS connector with specific publisher configuration→listener; channel→connector mapping is automatic when using JmsConnector.configBuilder( ); and prepare a JMS connector, which can be used by any channel.

In accordance with an embodiment, illustrated below is an example of how the system can be explicitly configured to produce messages to a JMS environment:

```
Channel<String> toJms = Channel.<String>builder( )
    .subscriberConfig(JmsConnector.configBuilder( )
        .jndiInitialFactory(ActiveMQInitialContextFactory.class)
        .jndiProviderUrl("tcp://127.0.0.1:61616")
        .type(JmsConfigBuilder.Type.QUEUE)
        .destination("se-example-queue-1")
        .build( )
    ).build( );
JmsConnector jmsConnector = JmsConnector.create( );
messaging = Messaging.builder( )
    .publisher(toJms, Multi.just("test1", "test2").map(Message::of))
    .connector(jmsConnector)
    .build( )
    .start( );
```

In accordance with an embodiment, the above example illustrates how the system can be used to: prepare a channel for connecting JMS connector with specific publisher configuration→listener; channel→connector mapping is automatic when using JmsConnector.configBuilder( ); and prepare a JMS connector, which can be used by any channel.

Implicit (Helidon) Configuration

In accordance with an embodiment, illustrated below is an example of how the system can be implicitly configured to operate with JMS:

```
mp.messaging:
    incoming.from-jms:
        connector: helidon-jms
        destination: se-example-queue-1
        session-group-id: session-group-1
        type: queue
    outgoing.to-jms:
        connector: helidon-jms
            destination: se-example-queue-1
            type: queue
    connector:
        helidon-jms:
            jndi:
                jms-factory: ConnectionFactory
                env-properties:
                    java.naming.factory.initial:
org.apache.activemq.jndi.ActiveMQInitialContextFactory
                            java.naming.provider.url: tcp://127.0.0.1:61616
```

In accordance with an embodiment, illustrated below is an example of how the system can be (implicity) configured to consume messages from a JMS environment:

```
Channel<String> fromJms = Channel.create("from-jms");
JmsConnector jmsConnector = JmsConnector.create( );
Messaging messaging = Messaging.builder( )
    .connector(jmsConnector)
    .listener(fromJms, payload -> {
        System.out.println("Jms says: " + payload);
    })
    .build( )
    .start( );
```

In accordance with an embodiment, the above example illustrates how the system can be used to: prepare a JMS connector, which can be used by any channel.

In accordance with an embodiment, illustrated below is an example of how the system can be (implicitly) configured to produce messages to a JMS environment:

```
Channel<String> toJms = Channel.create("to-jms");
JmsConnector jmsConnector = JmsConnector.create( );
messaging = Messaging.builder( )
    .publisher(toJms, Multi.just("test1", "test2").map(Message::of))
    .connector(jmsConnector)
    .build( )
    .start( );
```

In accordance with an embodiment, the above example illustrates how the system can be used to: prepare a JMS connector, which can be used by any channel.

Reactive Oracle AQ Connector

In accordance with an embodiment of the system that supports Helidon SE reactive messaging, the system can be used to connect streams to an AQ environment with reactive messaging, as described below.

```
<dependency>
    <groupId>io.helidon.messaging.aq</groupId>
    <artifactId>helidon-messaging-aq</artifactId>
</dependency>
```

Sending and Receiving

In accordance with an embodiment, illustrated below is an example of how the system can be configured to produce and consume messages to/from an AQ environment:

```
PoolDataSource pds = PoolDataSourceFactory.getPoolDataSource( );
pds.setConnectionFactoryClassName("oracle.jdbc.pool.OracleDataSource");
pds.setURL("jdbc:oracle:thin:@(DESCRIPTION=(ADDRESS=(PROTOCOL=TCP)(Host=192.168.0.123)
(Port=1521))(CONNECT_DATA=(SID=XE)))");
pds.setUser("frank");
pds.setPassword("frank");
AqConnector seConn = AqConnector.builder( )
      .dataSource("test-ds", pds)
      .build( );
Channel<String> toAq = Channel.<String>builder( )
      .name("toAq")
      .subscriberConfig(AqConnector.configBuilder( )
           .queue("example_queue_1")
           .dataSource("test-ds")
           .build( ))
      .build( );
Channel<String> fromAq = Channel.<String>builder( )
      .name("fromAq")
      .publisherConfig(AqConnector.configBuilder( )
           .queue("example_queue_1")
           .dataSource("test-ds")
           .build( ))
      .build( );
Messaging.builder( )
      .connector(seConn)
      .publisher(toAq, Multi.just("Hello", "world", "from", "Oracle",
"DB!").map(Message::of))
      .listener(fromAq, s -> System.out.pritln("Message received: "+s))
      .build( )
      .start( );
```

In accordance with an embodiment, the above example illustrates how the system can be used to: prepare Oracle UCP; setup an AQ connector and provide datasource with an identifier test-ds; setup channel for sending messages to queue example_queue_1 with datasource test-ds; setup channel for receiving messages from queue example_queue_1 with datasource test-ds; register connector and channels; add a publisher for several test messages to publish them to example_queue_1 immediately; and subscribe callback for any message coming from example_queue_1.

Helidon MP Reactive Messaging

As described above, in accordance with an embodiment, a microservices environment (microservices library) can be provided as one or more software libraries, such as for example a Helidon MP programming model or environment.

In accordance with an embodiment, MicroProfile reactive messaging uses CDI beans to produce, consume or process messages over Reactive streams. Such messaging bean is expected to be either in ApplicationScoped or Dependent scope. Messages are managed by methods annotated by @Incoming and @Outgoing and the invocation is always driven by message core—either at assembly time, or for every message coming from the stream. The bean can have methods annotated by @Incoming, @Outgoing or both.

TABLE 3

| messaging method | Bean method invoked by messaging Specification. |
| connector | Reactive Messaging connector. |
| channel | Named pair of producer and consumer, both sides can be either messaging method or connector. |

Consuming Methods with @Incoming Annotation

In accordance with an embodiment, the annotation has one required attribute value that defines the channel name. Such annotated messaging method can function in two ways: consume every message coming from the stream connected to the channel; or prepare reactive stream's subscriber and connect it to the channel.

In accordance with an embodiment, illustrated below is an example of consuming every message from channel example-channel-2:

```
@Incoming("example-channel-2")
public void printMessage(String msg) {
    System.out.println("Just received message: " + msg);
}
```

In accordance with an embodiment, illustrated below is an example of preparing reactive stream subscriber for channel example-channel-1:

```
@Incoming("example-channel-2")
public Subscriber<String> printMessage( ) {
    return ReactiveStreams.<String>builder( )
        .forEach(msg -> System.out.println("Just received
message: " + msg))
        .build( );
}
```

Producing Methods with @Outgoing Annotation

In accordance with an embodiment, the annotation has one required attribute value that defines the channel name. Such annotated messaging method can function in two ways: produce exactly one message to the stream connected to the channel; or prepare reactive stream's publisher and connect it to the channel.

In accordance with an embodiment, illustrated below is an example of producing exactly one message to channel example-channel-1:

```
@Outgoing("example-channel-1")
public String produceMessage( ) {
    return "foo";
}
```

In accordance with an embodiment, illustrated below is an example of preparing reactive stream publisher publishing three messages to the channel example-channel-1:

```
@Outgoing("example-channel-1")
public Publisher<String> printMessage( ) {
    return ReactiveStreams.of("foo", "bar", "baz").buildRs( );
}
```

Processing Methods with @Incoming and @Outgoing Annotation

In accordance with an embodiment, such methods acts as processors, consuming messages from one channel and producing messages to another. Such annotated messaging method can function in multiple ways: process every message; prepare reactive stream's processor and connect it between the channels; or on every message prepare new publisher (equivalent to flatMap operator)

In accordance with an embodiment, illustrated below is an example of processing every message from channel example-channel-1 to channel:

```
example-channel-2:
@Incoming("example-channel-1")
@Outgoing("example-channel-2")
public String processMessage(String msg) {
    return msg.toUpperCase( );
}
```

In accordance with an embodiment, illustrated below is an example of preparing a processor stream to be connected between channels:

```
example-channel-1 and example-channel-2:
@Incoming("example-channel-1")
@Outgoing("example-channel-2")
public Processor<String, String> processMessage( ) {
    return ReactiveStreams.<String>builder( )
        .map(String::toUpperCase)
        .buildRs( );
}
```

In accordance with an embodiment, illustrated below is an example of processing every message from channel example-channel-1 as a stream to be flattened to channel example-channel-2:

```
@Incoming("example-channel-1")
@Outgoing("example-channel-2")
public String processMessage(String msg) {
    return ReactiveStreams.of(msg.toUpperCase( ),
        msg.toLowerCase( )).buildRs( );
}
```

In accordance with an embodiment, to enable the use of reactive messaging in a software project, the following dependency can be declared in the project:

```
<dependency>
    <groupId>io.helidon.microprofile.messaging</groupId>
    <artifactId>helidon-microprofile-messaging</artifactId>
</dependency>
```

Health Checks

In accordance with an embodiment, messaging in Helidon includes built-in health probes for liveness and readiness. To activate it, the following dependency can be declared in the project:

```
<dependency>
    <groupId>io.helidon.microprofile.messaging</groupId>
    <artifactId>helidon-microprofile-messaging-health</artifactId>
</dependency>
```

In accordance with an embodiment, the above example illustrates how the system can be used to provide: liveness-channel is considered UP until cancel or onError signal is intercepted on it; and readiness-channel is considered DOWN until onSubscribe signal is intercepted on it. By checking health endpoints /health/live and /health/ready every messaging channel can be seen to have its own probe.

```
{
    "name": "messaging",
    "state": "UP",
    "status": "UP",
    "data": {
        "my-channel-1": "UP",
        "my-channel-2": "UP"
    }
}
```

Message

In accordance with an embodiment, the reactive messaging Message class can be used to wrap or unwrap data items between methods and connectors. The message wrapping and unwrapping can be performed explicitly by using org.eclipse.microprofile.reactive.messaging.Message#of(T) or implicitly through the messaging core. Illustrated below is an example of explicit and implicit wrapping and unwrapping:

```
@Outgoing("publisher-payload")
public PublisherBuilder<Integer> streamOfMessages( ) {
    return ReactiveStreams.of(0, 1, 2, 3, 4, 5, 6, 7, 8, 9);
}
@Incoming("publisher-payload")
@Outgoing("wrapped-message")
public Message<String> rewrapMessageManually(Message<Integer> message) {
    return Message.of(Integer.toString(message.getPayload( )));
}
@Incoming("wrapped-message")
public void consumeImplicitlyUnwrappedMessage(String value) {
    System.out.println("Consuming message: " + value);
}
```

Acknowledgements

In accordance with an embodiment, a message carries a callback for reception acknowledgement, acknowledgement in messaging methods is possible manually by org.eclipse.microprofile.reactive.messaging.Message#ack or automatically according explicit or implicit acknowledgement strategy by messaging core. Explicit strategy configuration can be provided by an @Acknowledgment annotation which has one required attribute value that expects the strategy type from enum org.eclipse.microprofile.reactive.messaging.Acknowledgment.Strategy.

Table 4 illustrates examples of acknowledgement strategies, in accordance with an embodiment.

TABLE 4

| | |
|---|---|
| @Acknowledgment(Acknowledgment.Strategy.NONE) | No acknowledgment. |
| @Acknowledgment(Acknowledgment.Strategy.MANUAL) | No automatic acknowledgment. |
| @Acknowledgment(Acknowledgment.Strategy.PRE_PROCESSING) | Ack automatically before method invocation or processing. |
| @Acknowledgment(Acknowledgment.Strategy.POST_PROCESSING) | Ack automatically after method invocation or processing. |

In accordance with an embodiment, illustrated below is an example of manual acknowledgment:

```
@Outgoing("consume-and-ack")
public PublisherBuilder<Integer> streamOfMessages( ) {
    return ReactiveStreams.of(Message.of("This is Payload", ( ) -> {
        System.out.println("This particular message was acked!");
        return CompletableFuture.completedFuture(null);
    })).buildRs( );
}
@Incoming("consume-and-ack")
@Acknowledgment(Acknowledgment.Strategy.MANUAL)
public void receiveAndAckMessage(Message<String> msg) {
    msg.ack( );
}
```

Calling ack( ) will print "This particular message was acked!" to System.out. In accordance with an embodiment, illustrated below is an example of manual acknowledgment:

```
@Outgoing("consume-and-ack")
public PublisherBuilder<Integer> streamOfMessages( ) {
    return ReactiveStreams.of(Message.of("This is Payload", ( ) -> {
        System.out.println("This particular message was acked!");
        return CompletableFuture.completedFuture(null);
    })).buildRs( );
}
@Incoming("consume-and-ack")
@Acknowledgment(Acknowledgment.Strategy.MANUAL)
public void receiveAndAckMessage(Message<String> msg) {
    msg.ack( );
}
```

Calling ack( ) will print "This particular message was acked!" to System.out. In accordance with an embodiment, illustrated below is an example of explicit pre-process acknowledgment:

```
@Outgoing("consume-and-ack")
public PublisherBuilder<Integer> streamOfMessages( ) {
    return ReactiveStreams.of(Message.of("This is Payload", ( ) -> {
        System.out.println("This particular message was acked!");
        return CompletableFuture.completedFuture(null);
    })).buildRs( );
}
/**
* Prints to the console:
* > This particular message was acked!
* > Method invocation!
*/
@Incoming("consume-and-ack")
@Acknowledgment(Acknowledgment.Strategy.PRE_PROCESSING)
public void receiveAndAckMessage(Message<String> msg) {
    System.out.println("Method invocation!");
}
```

In accordance with an embodiment, illustrated below is an example of explicit post-process acknowledgment:

```
@Outgoing("consume-and-ack")
public PublisherBuilder<Integer> streamOfMessages( ) {
    return ReactiveStreams.of(Message.of("This is Payload", ( ) -> {
        System.out.println("This particular message was acked!");
        return CompletableFuture.completedFuture(null);
    })).buildRs( );
}
/**
* Prints to the console:
* > Method invocation!
* > This particular message was acked!
*/
@Incoming("consume-and-ack")
@Acknowledgment(Acknowledgment.Strategy.POST_PROCESSING)
public void receiveAndAckMessage(Message<String> msg) {
    System.out.println("Method invocation!");
}
```

Messaging Connector Bean

In accordance with an embodiment, a messaging connector can be provided as an application scoped bean which implements IncomingConnectorFactory, OutgoingConnectorFactory or both.

In accordance with an embodiment, illustrated below is an example connector example-connector:

```
@ApplicationScoped
@Connector("example-connector")
public class ExampleConnector implements IncomingConnectorFactory,
OutgoingConnectorFactory {
    @Override
    public PublisherBuilder<? extends Message<?>>
    getPublisherBuilder(Config config) {
        return ReactiveStreams.of("foo", "bar")
            .map(Message::of);
    }
    @Override
    public SubscriberBuilder<? extends Message<?>, Void>
    getSubscriberBuilder(Config
config) {
        return ReactiveStreams.<Message<?>>builder( )
            .map(Message::getPayload)
            .forEach(o -> System.out.println("Connector says: " + o));
    }
}
```

In accordance with an embodiment, illustrated below is an example of channel to connector mapping config:

```
mp.messaging.outgoing.to-connector-channel.connector:
example-connector
mp.messaging.incoming.from-connector-channel.connector:
example-connector
```

In accordance with an embodiment, illustrated below is an example producing messages to connector:

```
@Outgoing("to-connector-channel")
public Publisher<String> produce( ) {
    return Flowable.just("fee", "fie");
}
> Connector says: fee
> Connector says: fie
```

In accordance with an embodiment, illustrated below is an example of consuming messages from connector:

```
@Incoming("from-connector-channel")
public void consume(String value) {
    System.out.println("Consuming: " + value);
}
> Consuming: foo
> Consuming: bar
```

Configuration

In accordance with an embodiment, illustrated below is an example connector accessing configuration:

```
@ApplicationScoped
@Connector("example-connector")
public class ExampleConnector implements IncomingConnectorFactory {
    @Override
    public PublisherBuilder<? extends Message<?>>
    getPublisherBuilder(final Config
config) {
        String firstPropValue = config.getValue("first-test-prop",
        String.class);
        String secondPropValue = config.getValue("second-test-prop",
        String.class);
        return ReactiveStreams.of(firstPropValue, secondPropValue)
```

```
            .map(Message::of);
    }
}
```

In this example, the configuration context is merged from channel and connector contexts.

In accordance with an embodiment, illustrated below is an example of channel to connector mapping configuration with custom properties:

```
mp.messaging.incoming.from-connector-channel.connector:
example-connector
mp.messaging.incoming.from-connector-channel.first-test-prop: foo
mp.messaging.connector.example-connector.second-test-prop: bar
```

In accordance with an embodiment, the above example illustrates how the system can be used to: provide a channel→connector mapping; provide channel configuration properties; and provide connector configuration properties.

In accordance with an embodiment, illustrated below is an example of consuming messages from connector:

```
@Incoming("from-connector-channel")
public void consume(String value) {
    System.out.println("Consuming: " + value);
}
> Consuming: foo
> Consuming: bar
```

Reactive Kafka Connector

In accordance with an embodiment of the system that supports Helidon MP reactive messaging, the system can be used to connect streams to a Kafka environment with reactive messaging, as described below.

```
<dependency>
    <groupId>io.helidon.microprofile.messaging</groupId>
    <artifactId>helidon-microprofile-messaging</artifactId>
</dependency>
<dependency>
    <groupId>io.helidon.messaging.kafka</groupId>
    <artifactId>helidon-messaging-kafka</artifactId>
</dependency>
```

In accordance with an embodiment, illustrated below is an example of connector configuration:

```
mp.messaging:
    incoming.from-kafka:
        connector: helidon-kafka
        topic: messaging-test-topic-1
        auto.offset.reset: latest
        enable.auto.commit: true
        group.id: example-group-id
    outgoing.to-kafka:
        connector: helidon-kafka
        topic: messaging-test-topic-1
    connector:
        helidon-kafka:
            bootstrap.servers: localhost:9092
            key.serializer: org.apache.kafka.common.serialization.StringSerializer
            value.serializer: org.apache.kafka.common.serialization.StringSerializer
            key.deserializer: org.apache.kafka.common.serialization.StringDeserializer
            value.deserializer: org.apache.kafka.common.serialization.StringDeserializer
```

In accordance with an embodiment, illustrated below is an example of consuming messages from a Kafka environment:

```
@Incoming("from-kafka")
public void consumeKafka(String msg) {
    System.out.println("Kafka says: " + msg);
}
```

In accordance with an embodiment, illustrated below is an example of producing messages to a Kafka environment:

```
@Outgoing("to-kafka")
public PublisherBuilder<String> produceToKafka( ) {
    return ReactiveStreams.of("test1", "test2");
}
```

Reactive JMS Connector

In accordance with an embodiment of the system that supports Helidon MP reactive messaging, the system can be used to connect streams to a JMS environment with reactive messaging, as described below.

```
<dependency>
    <groupId>io.helidon.microprofile.messaging</groupId>
    <artifactId>helidon-microprofile-messaging</artifactId>
</dependency>
<dependency>
    <groupId>io.helidon.messaging.jms</groupId>
    <artifactId>helidon-messaging-jms</artifactId>
</dependency>
```

Config

In accordance with an embodiment, Table 5 illustrates examples of attributes that can be used with a connector name: helidon-jms.

TABLE 5

| | |
|---|---|
| username | User name used to connect JMS session. |
| password | Password to connect JMS session. |
| type | Possible values are: queue, topic. |
| destination | Queue or topic name. |
| acknowledge-mode | Possible values are: AUTO_ACKNOWLEDGE- session automatically acknowledges a client's receipt of a message, CLIENT_ACKNOWLEDGE - receipt of a message is acknowledged only when Message.ack( ) is called manually, DUPS_OK_ACKNOWLEDGE - session lazily acknowledges the delivery of messages. Default value: AUTO_ACKNOWLEDGE. |
| transacted | Indicates whether the session will use a local transaction. Default value: false. |
| message-selector | JMS API message selector expression based on a subset of the SQL92. Expression can only access headers and properties, not the payload. |
| named-factory | Select in case factory is injected as a named bean or configured with name. |
| poll-timeout | Timeout for polling for next message in every poll cycle in millis. Default value: 50 |
| period-executions | Period for executing poll cycles in millis. Default value: 100. |
| session-group-id | When multiple channels share same session-group-id, they share same JMS session and same JDBC connection as well. |
| jndi.jms-factory | JNDI name of JMS factory. |
| jndi.env-properties | Environment properties used for creating initial context java.naming.factory.initial, java.naming.provider.url . . . |

Configured JMS Factory

In accordance with an embodiment, a simple use case includes looking up JMS ConnectionFactory in the naming context. In accordance with an embodiment, illustrated below is an example of connector configuration:

```
mp.messaging:
    incoming.from-jms:
        connector: helidon-jms
        destination: messaging-test-queue-1
        type: queue
    outgoing.to-jms:
        connector: helidon-jms
        destination: messaging-test-queue-1
        type: queue
    connector:
        helidon-jms:
            user: Gandalf
            password: mellon
            jndi:
                jms-factory: ConnectionFactory
                env-properties:
                    java.naming:
                        factory.initial: org.apache.activemq.jndi.ActiveMQInitialContextFactory
                        provider.url: tcp://localhost:61616
```

Injected JMS Factory

In accordance with an embodiment, illustrated below is an example of a more advanced setup, wherein a connector can work with an injected factory instance, for example:

```
Inject:
    @Produces
    @ApplicationScoped
    @Named("active-mq-factory")
    public ConnectionFactory connectionFactory( ) {
```

-continued

```
            return new
                ActiveMQConnectionFactory(config.get("jms.url").asString( ).get( ));
    }
Config:
jms:
    url: tcp://127.0.0.1:61616
mp:
    messaging:
        connector:
            helidon-jms:
                named-factory: active-mq-factory
        outgoing.to-jms:
            connector: helidon-jms
            session-group-id: order-connection-1
            destination: TESTQUEUE
            type: queue
        incoming.from-jms:
            connector: helidon-jms
            session-group-id: order-connection-1
            destination: TESTQUEUE
            type: queue
```

Consuming

In accordance with an embodiment, illustrated below is an example of consuming from a JMS environment one by one, with unwrapped value:

```
@Incoming("from-jms")
public void consumeJms(String msg) {
    System.out.println("JMS says: " + msg);
}
```

In accordance with an embodiment, illustrated below is an example of consuming from a JMS environment one by one, with manual ack:

```
@Incoming("from-jms")
@Acknowledgment(Acknowledgment.Strategy.MANUAL)
public CompletionStage<?> consumeJms(JmsMessage<String> msg) {
    System.out.println("JMS says: " + msg.getPayload( ));
    return msg.ack( );
}
```

Producing

In accordance with an embodiment, illustrated below is an example of producing messages to a JMS environment:

```
@Outgoing("to-jms")
public PublisherBuilder<String> produceToJms( ) {
    return ReactiveStreams.of("test1", "test2");
}
```

In accordance with an embodiment, illustrated below is an example of a more advanced producing messages to a JMS environment:

```
@Outgoing("to-jms")
public PublisherBuilder<String> produceToJms( ) {
    return ReactiveStreams.of("test1", "test2")
        .map(s -> JmsMessage.builder(s)
            .correlationID(UUID.randomUUID( ).toString( ))
            .property("stringProp", "cool property")
            .property("byteProp", 4)
            .property("intProp", 5)
            .onAck(( ) -> System.out.println("Acked!"))
            .build( ));
}
```

In accordance with an embodiment, illustrated below is another example of advanced producing messages to a JMS environment, with a custom mapper:

```
@Outgoing("to-jms")
public PublisherBuilder<String> produceToJms( ) {
    return ReactiveStreams.of("test1", "test2")
        .map(s -> JmsMessage.builder(s)
            .customMapper((p, session) -> {
                TextMessage textMessage =
                    session.createTextMessage(p);
                textMessage.setStringProperty("custom-mapped-property", "XXX" + p);
                return textMessage;
            })
            .build( )
        );
}
```

Reactive Oracle Advanced Queueing Connector

In accordance with an embodiment of the system that supports Helidon MP reactive messaging, the system can be used to connect streams to an AQ environment with reactive messaging, as described below. In accordance with an embodiment, this connector can be adapted to extend Helidon JMS connector with an AQ specific API.

```
<dependency>
    <groupId>io.helidon.microprofile.messaging</groupId>
    <artifactId>helidon-microprofile-messaging</artifactId>
</dependency>
<dependency>
    <groupId>io.helidon.messaging.aq</groupId>
    <artifactId>helidon-messaging-aq</artifactId>
</dependency>
```

Config

In accordance with an embodiment, Table 6 illustrates examples of attributes that can be used with a connector name: helidon-aq.

TABLE 6

| | |
|---|---|
| datasource | Name of the datasource bean used to connect Oracle DB with AQ. |
| url | jdbc connection string used to connect Oracle DB with AQ (forbidden when datasource is specified). |
| username | User name used to connect Oracle DB with AQ (forbidden when datasource is specified). |
| password | Password to connect Oracle DB with AQ (forbidden when datasource is specified). |
| type | Possible values are: queue, topic. |
| destination | Queue or topic name. |
| acknowledge-mode | Possible values are: AUTO_ACKNOWLEDGE- session automatically acknowledges a client's receipt of a message, CLIENT_ACKNOWLEDGE - receipt of a message is acknowledged only when Message.ack( ) is called manually, DUPS_OK_ACKNOWLEDGE - session lazily acknowledges the delivery of messages. Default value: AUTO_ACKNOWLEDGE. |
| transacted | Indicates whether the session will use a local transaction. Default value: false. |
| message-selector | JMS API message selector expression based on a subset of the SQL92. Expression can only access headers and properties, not the payload. |
| named-factory | Select in case factory is injected as a named bean or configured with name. |
| poll-timeout | Timeout for polling for next message in every poll cycle in millis. Default value: 50 |
| period-executions | Period for executing poll cycles in millis. Default value: 100. |
| session-group-id | When multiple channels share same session-group-id, they share same JMS session and same JDBC connection as well. |

Configured JMS Factory

In accordance with an embodiment, a simple use case includes leaving construction of AQJMSConnectionFactory to the connector. Illustrated below is an example of a connector configuration:

```
mp:
    messaging:
        connector:
            helidon-aq:
                transacted: false
                acknowledge-mode: CLIENT_ACKNOWLEDGE
                url:
jdbc:oracle:thin:@(DESCRIPTION=(ADDRESS=(PROTOCOL=TCP)(Host=192.168.0.123)(Port=1521))
(CONNECT_DATA=(SID=TESTSID)))
                user: gandalf
                password: mellon
        outgoing.to-aq:
            connector: helidon-aq
            destination: TESTQUEUE
            type: queue
        incoming.from-aq:
            connector: helidon-aq
            destination: TESTQUEUE
            type: queue
```

In accordance with an embodiment, the system allows use or reference to configured datasource, such as for example an Oracle Universal Connection Pool (UCP) datasource. Illustrated below is an example of connector configuration with an Oracle UCP datasource:

```
javax:
    sql:
        DataSource:
            aq-test-ds:
                connectionFactoryClassName: oracle.jdbc.pool.OracleDataSource
                URL:
jdbc:oracle:thin:@exampledb_high?TNS_ADMIN=/home/gandalf/wallets/Wallet_EXAMPLEDB
                user: gandalf
                password: SuperSecretPassword1234
mp:
    messaging:
        connector:
            helidon-aq:
                transacted: false
                acknowledge-mode: CLIENT_ACKNOWLEDGE
                data-source: aq-test-ds
        outgoing.toJms:
            connector: helidon-aq
            destination: TESTQUEUE
            type: queue
```

```
            incoming.fromJms:
                connector: helidon-aq
                destination: TESTQUEUE
                type: queue
```

Injected JMS Factory

In accordance with an embodiment, for a more advanced setup, a connector can work with injected AQJMSConnectionFactory:

```
Inject:
        @Produces
        @ApplicationScoped
        @Named("aq-orderdb-factory")
        public AQjmsConnectionFactory connectionFactory( ) throws JMSException {
                AQjmsQueueConnectionFactory fact = new AQjmsQueueConnectionFactory( );
                fact.setJdbcURL(config.get("jdbc.url").asString( ).get( ));
                fact.setUsername(config.get("jdbc.user").asString( ).get( ));
                fact.setPassword(config.get("jdbc.pass").asString( ).get( ));
                return fact;
        }
Config:
jdbc:
    url:
jdbc:oracle:thin:@(DESCRIPTION=(ADDRESS=(PROTOCOL=TCP)(Host=192.168.0.123)(Port=1521))
(CONNECT_DATA=(SID=TESTSID)))
    user: gandalf
    pass: mellon
mp:
    messaging:
        connector:
            helidon-aq:
                named-factory: aq-orderdb-factory
        outgoing.to-aq:
            connector: helidon-aq
            session-group-id: order-connection-1
            destination: TESTQUEUE
            type: queue
        incoming.from-aq:
            connector: helidon-aq
            session-group-id: order-connection-1
            destination: TESTQUEUE
            type: queue
```

Consuming

In accordance with an embodiment, illustrated below is an example of consuming from an AQ environment one by one, with unwrapped value:

```
        @Incoming("from-aq")
        public void consumeAq(String msg) {
            System.out.println("Oracle AQ says: " + msg);
        }
```

In accordance with an embodiment, illustrated below is an example of consuming from an AQ environment one by one, with manual ack:

```
@Incoming("from-aq")
@Acknowledgment(Acknowledgment.Strategy.MANUAL)
public CompletionStage<?> consumeAq(AqMessage<String> msg) {
    // direct commit
    //msg.getDbConnection( ).commit( );
    System.out.println("Oracle AQ says: " + msg.getPayload( ));
    // ack commits only in non-transacted mode
    return msg.ack( );
}
```

Producing

In accordance with an embodiment, illustrated below is an example of producing messages to an AQ environment:

```
        @Outgoing("to-aq")
        public PublisherBuilder<String> produceToAq( ) {
            return ReactiveStreams.of("test1", "test2");
        }
```

Oracle Advanced Queueing (AQ) Example

In accordance with an embodiment, provided below is another example use of reactive messaging with an AQ environment. In this example, to connect with Helidon MP, we use the MicroProfile reactive messaging implementation, an AQ messaging connector, and Helidon support for Oracle Universal Connection Pool (UCP) data source.

```
<dependency>
    <groupId>io.helidon.microprofile.messaging</groupId>
    <artifactId>helidon-microprofile-messaging</artifactId>
</dependency>
<dependency>
    <groupId>io.helidon.messaging.aq</groupId>
    <artifactId>helidon-messaging-aq</artifactId>
</dependency>
```

```
<dependency>
    <groupId>io.helidon.integrations.cdi</groupId>
    <artifactId>helidon-integrations-cdi-datasource-ucp</artifactId>
</dependency>
```

In this example, a UCP connection pool is used as a datasource to connect to the Oracle Database; including first preparing the UCP datasource, and then referencing it from the AQ connector configuration with mp.messaging.connector.helidon-aq.data-source configuration property.

```
javax:
    sql:
        DataSource:
            local-example-ds:
                connectionFactoryClassName:
                    oracle.jdbc.pool.OracleDataSource
                URL: jdbc:oracle:thin:@localhost:1521:XE
                user: frank
                password: frank
mp:
    messaging:
        connector:
            helidon-aq:
                data-source: local-example-ds
        outgoing.to-aq:
            connector: helidon-aq
            destination: example_queue_1
            type: queue
        incoming.from-aq:
            connector: helidon-aq
            destination: example_queue_1
            type: queue
```

Once the UCP datasource is set up, we can prepare reactive messaging methods. For example, we can prepare one method for publishing messages to an outgoing channel called to-aq every 2 seconds; and another method for consuming the incoming channel called from-aq. Both channels are configured for example-queue-1 destination. Produced messages are consumed immediately after a short trip to and from the Oracle database.

```
@Outgoing("to-aq")
    public Publisher<String> toAq( ) {
        return FlowAdapters.toPublisher(
            Multi.interval(2, TimeUnit.SECONDS,
Executors.newSingleThreadScheduledExecutor( ))
                .map(i -> "Message " + i)
        );
```

```
}
@Incoming("from-aq")
public CompletionStage<?> fromAq(AqMessage<String> msg) {
    System.out.println("Received: " + msg.getPayload( ));
    return msg.ack( );
}
```

In accordance with an embodment, the AQ connector fully integrates with a MicroProfile reactive messaging Acknowledgement feature. The default ack mode is AUTO_ACKNOWLEDGE, which means that every received message is acknowledged immediately upon reception by the connector. In the event of a failure during processing of a message, such as an error between the connector and phase once the message is considered successfully consumed, then the message will not be resent. To move the actual acknowledgement control to the business code, we can set up acknowledge-mode to CLIENT_AC-KNOWLEDGE.

```
mp:
    messaging:
        connector:
            helidon-aq:
                data-source: local-example-ds
                acknowledge-mode: CLIENT_ACKNOWLEDGE
```

We can leave the acknowledgement to messaging itself, as every messaging method has a clearly defined default acknowledgement strategy or call Message.ack( ) manually. As with other Helidon connectors, the AQ connector also works with Helidon SE reactive messaging API; all that is needed is the AQ connector dependency:

```
<dependency>
    <groupId>io.helidon.messaging.aq</groupId>
    <artifactId>helidon-messaging-aq</artifactId>
    <version>2.2.0</version>
</dependency>
```

The AQ connector can also be used with SE messaging, for example by adding a snippet directly in the main method:

```
PoolDataSource pds = PoolDataSourceFactory.getPoolDataSource( );
    pds.setConnectionFactoryClassName("oracle.jdbc.pool.OracleDataSource");
    pds.setURL("jdbc:oracle:thin:@localhost:1521:XE");
    pds.setUser("frank");
    pds.setPassword("frank");
    AqConnector seConn = AqConnector.builder( )
        .dataSource("test-ds", pds)
        .build( );
    Channel<String> toAq = Channel.<String>builder( )
        .name("toAq")
        .subscriberConfig(AqConnector.configBuilder( )
            .queue("example_queue_1")
            .dataSource("test-ds")
            .build( ))
        .build( );
    Channel<String> fromAq = Channel.<String>builder( )
        .name("fromAq")
        .publisherConfig(AqConnector.configBuilder( )
```

```
            .queue("example_queue_1")
            .dataSource("test-ds")
            .build())
        .build();
    CountDownLatch messagesDeliveredLatch = new CountDownLatch(5);
    Messaging.builder()
        .connector(seConn)
        .publisher(toAq, Multi.just("Hello", "world", "from", "Oracle",
"DB!").map(Message::of))
        .listener(fromAq, s -> {
            System.out.println("Message received: " + s);
            messagesDeliveredLatch.countDown();
        })
        .build()
        .start();
    // Wait for all messages
    messagesDeliveredLatch.await(15, TimeUnit.SECONDS);
```

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein illustrate usage in a Helidon microservices environment, various embodiments can be used with other types of microservice environments or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use of a reactive messaging client in a microservices environment; comprising:

a computer including one or more processors, that provides access to a microservices environment for use with software applications;

a reactive engine that provides a reactive messaging API and operators that can be used with reactive streams, to enable client and server applications to communicate within the microservices environment, for use with long-running activities associated with microservices, each long-running activity spanning two or more distinct microservices within the microservices environment; and one or more messaging connectors adapted to provide publishers and subscribers for channels used in reactive messaging with services and/or server applications, the one or more messaging connectors comprising a microservices-based Java Message Service (JMS) connector operable with the reactive engine for use with the long-running activities associated with microservices, wherein the microservices-based JMS connector is connected to an Advance Queuing (AQ) environment via an AQ specific Application Programming Interface (API);

wherein the system supports the use of a microservices architectural pattern to implement transactions within the AQ environment, the microservices architectural pattern enabling each long-running activity that spans a plurality of microservices to be performed by the plurality of microservices as a series of local transactions at one local database provided within a database environment, each local transaction updating or publishing a message or event to trigger a next local transaction in the pattern, which message or event is recorded to the one local database together with an identifier for identifying an associated microservice;

wherein upon committing a long-running activity spanning the plurality of microservices and their associated transactions based upon a successful completion of each of the series of local transactions performed by the microservices at the one local database, each of the microservices of the plurality of microservices commit; and wherein upon rollback of the long-running activity spanning the plurality of microservices and their associated transactions based upon a failure of a local transaction of the series of local transactions performed by the plurality of microservices at the one local database, one or more appropriate compensation actions are determined, based upon the identifiers stored at the one local database, by the database environment for each of the plurality of microservices preceding the failed local transaction and performed, by the database environment, at the local database utilizing the identifiers stored at the one local database.

2. The system of claim 1, wherein the microservices environment is a Helidon environment, for use with one or more cloud computing or other environments.

3. The system of claim 1, wherein the microservices architectural pattern operates so that persisted states/events associated with transactions and services can be persisted or stored locally at a database that supports the use of identifiers.

4. The system of claim 1,
wherein the each of the distinct services and/or server transactions that the long-running activity spans are associated with one or more microservices via one or more channels, each of the one or more channels comprising a connector defined by the reactive engine.

5. The system of claim 4,
wherein at least one of the connectors defined by the reactive engine is annotated and stored for re-use.

6. A method for use a reactive messaging client in a microservices environment, the method comprising:
providing, in association with a microservices environment for use with software applications:
a reactive engine that provides a reactive messaging API and operators that can be used with reactive streams, to enable client and server applications to communicate within the microservices environment, for use with long-running activities associated with microservices, each long-running activity spanning two or more distinct microservices within the microservices environment; and
one or more messaging connectors adapted to provide publishers and subscribers for channels used in reactive messaging with services and/or server applications, the one or more messaging connectors comprising a microservices-based Java Message Service (JMS) connector operable with the reactive engine for use with the long-running activities associated with microservices, wherein the microservices-based JMS connector is connected to an Advance Queuing (AQ) environment via an AQ specific Application Programming Interface (API);
utilizing a microservices architectural pattern to implement transactions within the AQ environment, the microservices architectural pattern enabling each long-running activity that spans a plurality of microservices to be performed by the plurality of microservices as a series of local transactions at one local database provided within a database environment, each local transaction updating or publishing a message or event to trigger a next local transaction in the pattern, which message or event is recorded to the one local database together with an identifier for identifying an associated microservice;
upon successful completion of a long-running activity spanning the plurality of microservices and their associated transactions based upon a successful completion of each of the series of local transactions performed by the microservices at the one local database, committing by each of the microservices of the plurality of microservices; and
upon rollback of the long-running activity spanning the plurality of microservices and their associated transactions based upon a failure of a local transaction of the series of local transactions performed by the plurality of microservices at the one local database, determining, by the database environment and based upon the identifiers stored at the one local database, for each of the plurality of microservices preceding the failed local transaction one or more appropriate compensation actions, and performing the determined one or more appreciate compensation actions at the one local database utilizing the identifiers stored at the local database.

7. The method of claim 6, wherein the microservices environment is a Helidon environment, for use with one or more cloud computing or other environments.

8. The method of claim 6, wherein the microservices architectural pattern operates so that persisted states/events associated with transactions and services can be persisted or stored locally at a database that supports the use of identifiers.

9. The method of claim 6,
wherein the each of the distinct services and/or server transactions that the long-running activity spans are associated with one or more microservices via one or more channels, each of the one or more channels comprising a connector defined by the reactive engine.

10. The method of claim 9,
wherein at least one of the connectors defined by the reactive engine is annotated and stored for re-use.

11. A non-transitory computer readable storage medium, including instructions stored thereon which when read and executed by one or more computers cause the one or more computers to perform the steps comprising:
providing, in association with a microservices environment for use with software applications:
a reactive engine that provides a reactive messaging API and operators that can be used with reactive streams, to enable client and server applications to communicate within the microservices environment, for use with long-running activities associated with microservices, each long-running activity spanning two or more distinct microservices within the microservices environment; and
one or more messaging connectors adapted to provide publishers and subscribers for channels used in reactive messaging with services and/or server applications, the one or more messaging connectors comprising a microservices-based Java Message Service (JMS) connector operable with the reactive engine for use with the long-running activities associated with microservices, wherein the microservices-based JMS connector is connected to an Advance Queuing (AQ) environment via an AQ specific Application Programming Interface (API);
utilizing a microservices architectural pattern to implement transactions within the AQ environment, the microservices architectural pattern enabling each long-running activity that spans a plurality of microservices to be performed by the plurality of microservices as a series of local transactions at one local database provided within a database environment, each local transaction updating or publishing a message or event to trigger a next local transaction in the pattern, which message or event is recorded to the one local database together with an identifier for identifying an associated microservice;
upon successful completion of a long-running activity spanning the plurality of microservices and their associated transactions based upon a successful completion of each of the series of local transactions performed by the microservices at the one local database, committing by each of the microservices of the plurality of microservices; and
upon rollback of the long-running activity spanning the plurality of microservices and their associated transactions based upon a failure of a local transaction of the series of local transactions performed by the plurality of microservices at the one local database, determining, by the database environment and based upon the identifiers stored at the one local database, for each of the plurality of microservices preceding the failed local transaction one or more appropriate compensation actions, and performing the determined one or more appreciate compensation actions at the one local database utilizing the identifiers stored at the local database.

12. The non-transitory computer readable storage medium of claim 11, wherein the microservices environment is a Helidon environment, for use with one or more cloud computing or other environments.

13. The non-transitory computer readable storage medium of claim 11, wherein the microservices architectural pattern operates so that persisted states/events associated with transactions and services can be persisted or stored locally at a database that supports the use of microservices architectural identifiers.

14. The non-transitory computer readable storage medium of claim 11,
   wherein the each of the distinct services and/or server transactions that the long-running activity spans are associated with one or more microservices via one or more channels, each of the one or more channels comprising a connector defined by the reactive engine.

15. The non-transitory computer readable storage medium of claim 14,
   wherein at least one of the connectors defined by the reactive engine is annotated and stored for re-use.

* * * * *